United States Patent [19]

Schonbach

[11] Patent Number: 5,036,262
[45] Date of Patent: Jul. 30, 1991

[54] METHOD OF DETERMINING CONTROL INSTRUCTIONS

[75] Inventor: Dave I. Schonbach, Hockessin, Del.

[73] Assignee: E. I. Du Pont de Nemours and Company, Wilmington, Del.

[21] Appl. No.: 406,653

[22] Filed: Sep. 13, 1989

[51] Int. Cl.⁵ .............................................. H02K 41/03
[52] U.S. Cl. ...................................... 318/38; 318/135
[58] Field of Search .................... 318/35, 38, 119, 122, 318/125, 126, 132, 135, 567, 696; 310/12, 13, 14

[56] References Cited

U.S. PATENT DOCUMENTS

| | | | |
|---|---|---|---|
| 3,803,466 | 4/1974 | Starkey | 318/38 X |
| 4,348,618 | 9/1982 | Nakamura et al. | 318/38 |
| 4,454,457 | 6/1984 | Nakamura et al. | 318/135 |
| 4,675,582 | 6/1987 | Hommes et al. | 318/38 |
| 4,721,892 | 1/1988 | Nakamura et al. | 318/135 X |
| 4,853,602 | 8/1989 | Hommes et al. | 318/38 |

Primary Examiner—Bentsu Ro

[57] ABSTRACT

Methods for rapidly determining the discrete control information to independently propel a plurality of carriages with a synchronous linear motor divided into zones for control are useful for a steady state or a transition operation for a linear motor control system. The methods include the steps of representing the data describing the motion profile for each carriage in terms of memory address ticks versus linear motor primary teeth; determining the arrangement of data in a zone controller memory by performing a modulo operation on the profile motion data for each zone; developing the overall motion profiles for steady state operation by defining and combining individual segments of motion curves using a variety of predetermined continuous analog relationships stored in a computer; and determining the data for the many intermediate transition curves between steady states by proportionately distributing data points for each intermediate transition curved between steady state data points, the proportion determined by a weighting function.

9 Claims, 33 Drawing Sheets

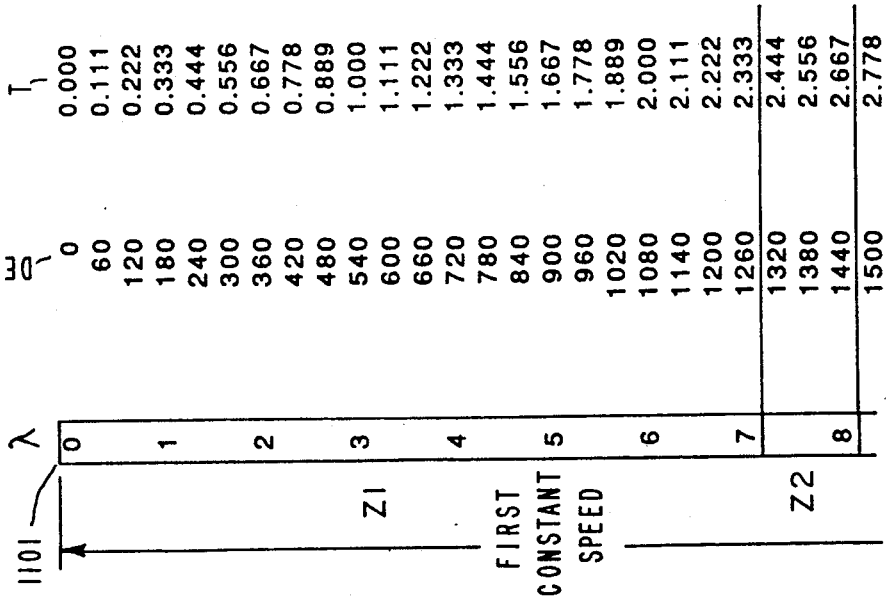

FIG. 1A

| | | |
|---|---|---|
| Z3 | 9 | 1560 2.889 |
| | | 1620 3.000 |
| Z4 | 10 | 1680 3.108 |
| | | 1740 3.212 |
| | | 1800 3.310 |
| Z5 | 11 | 1860 3.404 |
| | | 1920 3.495 |
| | | 1980 3.581 |
| | 12 | 2040 3.665 |
| | | 2100 3.745 |
| | | 2160 3.822 |
| Z6 | 13 | 2220 3.897 |
| | | 2280 3.969 |
| | | 2340 4.039 |
| | 14 | 2400 4.107 |
| | | 2460 4.172 |
| | | 2520 4.236 |
| | | 2580 4.298 |
| | 15 | 2640 4.358 |
| | | 2700 4.417 |
| | 16 | 2760 4.474 |
| | | 2820 4.529 |
| | | 2880 4.584 |
| | | 2940 4.636 |
| | | 3000 4.688 |
| ACCELERATION | 17 | 3060 4.738 |
| | | 3120 4.788 |
| Z7 | 18 | 3180 4.836 |
| | | 3240 4.883 |
| | | 3300 4.929 |

FIG. 2A

| | | | |
|---|---|---|---|
| Z3 | 26 | 3810.4 | 110 |
| | 27 | 3957.0 | 010 |
| Z4 | 28 | 4099.9 | 011 |
| | 29 | 4236.0 | 001 |
| | 30 | 4366.0 | 101 |
| Z5 | 31 | 4490.2 | 100 |
| | 32 | 4609.3 | 110 |
| | 33 | 4723.7 | 010 |
| | 34 | 4833.6 | 011 |
| | 35 | 4939.4 | 001 |
| | 36 | 5041.5 | 101 |
| | 37 | 5140.1 | 100 |
| | 38 | 5235.3 | 110 |
| | 39 | 5327.5 | 010 |
| Z6 | 40 | 5416.9 | 011 |
| | 41 | 5503.5 | 001 |
| | 42 | 5587.5 | 101 |
| | 43 | 5669.2 | 100 |
| | 44 | 5748.6 | 110 |
| | 45 | 5825.8 | 010 |
| Z7 | 46 | 5901.0 | 011 |
| | 47 | 5974.3 | 001 |
| | 48 | 6045.8 | 101 |
| | 49 | 6115.5 | 100 |
| | 50 | 6183.5 | 110 |
| | 51 | 6250.0 | 010 |
| | 52 | 6314.9 | 011 |
| | 53 | 6378.4 | 001 |
| | 54 | 6440.6 | 101 |
| | 55 | 6501.4 | 100 |

PORTION OF ZONE 7 TICKS VS BIT PATTERN (TYP)

| TICKS 1106 | BIT PATTERN 1108 |
|---|---|
| 6670 | 010 |
| 6671 | 010 |
| 6672 | 010 |
| 6673 | 010 |
| 6674 | 010 |
| 6675 | 010 |
| 6676 | 011 |
| 6677 | 011 |
| 6678 | 011 |
| 6679 | 011 |
| 6680 | 011 |
| ... | ... |
| 6727 | 011 |
| 6728 | 011 |
| 6729 | 011 |
| 6730 | 011 |

FIG. 1B

| | | |
|---|---|---|
| 19 | 3360 | 4.974 |
| | 3420 | 5.018 |
| | 3480 | 5.062 |
| | 3540 | 5.104 |
| 20 | 3600 | 5.146 |
| | 3660 | 5.187 |
| 21 | 3720 | 5.227 |
| | 3780 | 5.266 |
| | 3840 | 5.305 |
| 22 | 3900 | 5.343 |
| | 3960 | 5.380 |
| | 4020 | 5.417 |
| 23 | 4080 | 5.454 |
| | 4140 | 5.491 |
| | 4200 | 5.528 |
| 24 | 4260 | 5.566 |
| | 4320 | 5.603 |
| | 4380 | 5.640 |
| 25 | 4440 | 5.677 |
| | 4500 | 5.714 |
| | 4560 | 5.751 |
| 26 | 4620 | 5.788 |
| | 4680 | 5.825 |
| 27 | 4740 | 5.862 |
| | 4800 | 5.899 |
| | 4860 | 5.936 |
| 28 | 4920 | 5.973 |
| | 4980 | 6.010 |
| | 5040 | 6.047 |
| | 5100 | 6.084 |

| | | |
|---|---|---|
| 56 | 6560.9 | 110 |
| 57 | 6619.2 | 010 |
| 58 | 6676.4 | 011 |
| 59 | 6732.4 | 001 |
| 60 | 6787.4 | 101 |
| 61 | 6841.3 | 100 |
| 62 | 6894.2 | 110 |
| 63 | 6946.2 | 010 |
| 64 | 6997.2 | 011 |
| 65 | 7047.4 | 001 |
| 66 | 7096.7 | 101 |
| 67 | 7145.5 | 100 |
| 68 | 7194.4 | 110 |
| 69 | 7243.2 | 010 |
| 70 | 7292.1 | 011 |
| 71 | 7340.9 | 001 |
| 72 | 7389.8 | 101 |
| 73 | 7438.6 | 100 |
| 74 | 7487.5 | 110 |
| 75 | 7536.3 | 010 |
| 76 | 7585.2 | 011 |
| 77 | 7634.0 | 001 |
| 78 | 7682.9 | 101 |
| 79 | 7731.7 | 100 |
| 80 | 7780.6 | 110 |
| 81 | 7829.4 | 010 |
| 82 | 7878.3 | 011 |
| 83 | 7927.1 | 001 |
| 84 | 7976.0 | 101 |
| 85 | 8024.8 | 100 |

| | | |
|---|---|---|
| 6731 | | 011 |
| 6732 | | 001 |
| 6733 | | 001 |
| 6734 | | 001 |
| 6735 | | 001 |
| 6736 | | 001 |
| 6737 | | 001 |
| 6738 | | 001 |
| 6739 | | 001 |
| 6781 | | 001 |
| 6782 | | 001 |
| 6783 | | 001 |
| 6784 | | 001 |
| 6785 | | 001 |
| 6786 | | 001 |
| 6787 | | 101 |
| 6788 | | 101 |
| 6789 | | 101 |
| 6790 | | 101 |
| 6791 | | 101 |
| 6792 | | 101 |
| 6793 | | 101 |
| 6794 | | 101 |

| | | |
|---|---|---|
| 29 | 5160 | 6.121 |
|    | 5220 | 6.158 |
|    | 5280 | 6.195 |
| 30 | 5340 | 6.232 |
|    | 5400 | 6.269 |
|    | 5460 | 6.306 |
| 31 | 5520 | 6.343 |
|    | 5580 | 6.380 |
|    | 5640 | 6.417 |
| 32 | 5700 | 6.454 |
|    | 5760 | 6.491 |
|    | 5820 | 6.528 |
| 33 | 5880 | 6.566 |
|    | 5940 | 6.603 |
| 34 | 6000 | 6.640 |
|    | 6060 | 6.677 |
|    | 6120 | 6.714 |
|    | 6180 | 6.751 |
| 35 | 6240 | 6.788 |
|    | 6300 | 6.825 |
|    | 6360 | 6.862 |
| 36 | 6420 | 6.899 |
|    | 6480 | 6.936 |
|    | 6540 | 6.973 |
| 37 | 6600 | 7.010 |
|    | 6660 | 7.047 |
|    | 6720 | 7.084 |
| 38 | 6780 | 7.121 |
|    | 6840 | 7.158 |
|    | 6900 | 7.195 |

Z9: rows 29–33; Z10: rows 34–38

FIG. 2C

| | | |
|---|---|---|
| 86 | 8073.7 | 110 |
| 87  Z8 | 8122.5 | 010 |
| 88 | 8171.4 | 011 |
| 89 | 8220.2 | 001 |
| 90 | 8269.1 | 101 |
| 91 | 8317.9 | 100 |
| 92 | 8366.8 | 110 |
| 93 | 8415.7 | 010 |
| 94 | 8464.5 | 011 |
| 95 | 8513.4 | 001 |
| 96 | 8562.2 | 101 |
| 97 | 8611.1 | 100 |
| 98 | 8659.9 | 110 |
| 99 | 8708.8 | 010 |
| 100 | 8757.6 | 011 |
| 101 | 8806.5 | 001 |
| 102 | 8855.3 | 101 |
| 103 | 8904.2 | 100 |
| 104 | 8953.0 | 110 |
| 105 | 9001.9 | 010 |
| 106 | 9050.7 | 011 |
| 107 | 9099.6 | 001 |
| 108  Z10 | 9148.4 | 101 |
| 109 | 9197.3 | 100 |
| 110 | 9246.1 | 110 |
| 111 | 9295.0 | 010 |
| 112 | 9343.8 | 011 |
| 113 | 9392.7 | 001 |
| 114 | 9441.5 | 101 |
| 115 | 9490.4 | 100 |

Z9 spans rows 87–107.

FIG. 1D

| | | |
|---|---|---|
| 39 | 6960 | 7.232 |
| | 7020 | 7.269 |
| | 7080 | 7.306 |
| | 7140 | 7.343 |
| 40 | 7200 | 7.380 |
| 41 | 7260 | 7.417 |
| | 7320 | 7.454 |
| | 7380 | 7.491 |
| | 7440 | 7.528 |
| 2ND CONSTANT 42 | 7500 | 7.566 |
| SPEED | 7560 | 7.603 |
| | 7620 | 7.640 |
| Z11 | 7680 | 7.677 |
| 43 | 7740 | 7.714 |
| | 7800 | 7.751 |
| | 7860 | 7.788 |
| 44 | 7920 | 7.825 |
| | 7980 | 7.862 |
| | 8040 | 7.899 |
| 45 | 8100 | 7.936 |
| | 8160 | 7.973 |
| | 8220 | 8.010 |
| 46 | 8280 | 8.047 |
| | 8340 | 8.084 |
| | 8400 | 8.121 |
| 47 | 8460 | 8.158 |
| 48 | 8520 | 8.195 |
| | 8580 | 8.232 |
| | 8640 | 8.269 |
| | 8700 | 8.306 |

FIG. 2D

| | | |
|---|---|---|
| 116 | 9539.2 | 110 |
| 117 | 9588.1 | 010 |
| 118 Z10 | 9636.9 | 011 |
| 119 | 9685.8 | 001 |
| 120 | 9734.7 | 101 |
| 121 | 9783.5 | 100 |
| 122 | 9832.4 | 110 |
| 123 | 9881.2 | 010 |
| 124 | 9930.1 | 011 |
| 125 | 9978.9 | 001 |
| 126 | 10027.8 | 101 |
| 127 | 10076.6 | 100 |
| 128 | 10125.5 | 110 |
| 129 | 10174.3 | 010 |
| 130 | 10223.2 | 011 |
| 131 | 10272.0 | 001 |
| 132 | 10320.9 | 101 |
| 133 | 10369.7 | 100 |
| 134 | 10418.6 | 110 |
| 135 | 10467.4 | 010 |
| 136 | 10516.3 | 011 |
| 137 | 10565.1 | 001 |
| 138 | 10614.0 | 101 |
| 139 | 10662.8 | 100 |
| 140 | 10711.7 | 110 |
| 141 | 10760.5 | 010 |
| 142 | 10809.4 | 011 |
| 143 Z12 | 10858.2 | 001 |
| 144 | 10907.1 | 101 |
| 145 | 10955.9 | 100 |

FIG. 1E

| | | |
|---|---|---|
| 49 | 8760 | 8.343 |
|  | 8820 | 8.380 |
| 50 | 8880 | 8.417 |
|  | 8940 | 8.454 |
| 51 | 9000 | 8.491 |
|  | 9060 | 8.528 |
| 52 | 9120 | 8.566 |
|  | 9180 | 8.603 |
| 53 | 9240 | 8.640 |
|  | 9300 | 8.677 |
| 54 | 9360 | 8.714 |
|  | 9420 | 8.751 |
|  | 9480 | 8.788 |
|  | 9540 | 8.825 |
|  | 9600 | 8.862 |
|  | 9660 | 8.899 |
|  | 9720 | 8.936 |
| 55 | 9780 | 8.973 |
|  | 9840 | 9.010 |
|  | 9900 | 9.047 |

| | | |
|---|---|---|
| 146 | 11004.8 | 110 |
| 147 | 11053.7 | 010 |
| 148 | 11102.5 | 011 |
| 149 | 11151.4 | 001 |
| 150 | 11200.2 | 101 |
| 151 | 11249.1 | 100 |
| 152 | 11297.9 | 110 |
| 153 | 11346.8 | 010 |
| 154 | 11395.6 | 011 |
| 155 | 11444.5 | 001 |
| 156 | 11493.3 | 101 |
| 157 | 11542.2 | 100 |
| 158 | 11591.0 | 110 |
| 159 | 11639.9 | 010 |
| 160 | 11688.7 | 011 |
| 161 | 11737.6 | 001 |
| 162 | 11786.4 | 101 |
| 163 | 11835.3 | 100 |
| 164 | 11884.1 | 110 |
| | 11933.0 | 010 |
| | 11981.9 | 011 |
| 165 | 12030.7 | 001 |

| | |
|---|---|
| 12079.5 | 101 |
| 12128.4 | 100 |
| 12177.2 | 110 |
| 12226.1 | 010 |
| 12275.0 | 011 |
| 12323.8 | 001 |
| 12372.6 | 101 |
| 12421.5 | 100 |
| 12470.4 | 110 |
| 12519.2 | 010 |
| 12568.0 | 011 |
| 12616.9 | 001 |
| 12665.8 | 101 |
| 12714.6 | 100 |
| 12763.5 | 110 |
| 12812.3 | 010 |
| 12861.1 | 011 |
| 12910.0 | 001 |
| 12958.9 | 101 |
| 13007.7 | 100 |
| 13056.5 | 110 |
| 13105.4 | 010 |
| 13154.2 | 011 |

| CURRENT POSITION (FIG. 14) | DISTANCE TO CURR. POSITION | DESIRED SPEED AT CURR. POS. | DESIRED ACCEL. TYPE FROM PREVIOUS POS. TO CURRENT POS. |
|---|---|---|---|
| 920 | 0 | 100 | — |
| 921 | 80 | 100 | 1 |
| 914 | 140 | 200 | 4 ACCEL |
| 924 | 200 | 350 | 6 ACCEL |
| 925 | 240 | 350 | 1 |
| 892 | 350 | 340 | 2 DECEL |
| 929 | 500 | 340 | 1 |

| TOOTH 67 CARRIAGES | 1-2 | 2-3 | 3-4 | 4-5 | 5-6 | 6-7 | 7-8 | 8-9 | 9-10 | 10-11 | 11-12 |
|---|---|---|---|---|---|---|---|---|---|---|---|
| TOOTH POSITIONS | 94-67 | 94-67 | 94-67 | 94-67 | 94-67 | 94-67 | 95-67 | 97-67 | 100-67 | 102-67 | 103-67 |
| SPACING | 27 | 27 | 27 | 27 | 27 | 27 | 28 | 30 | 33 | 35 | 36 |
| TOOTH 165 CARRIAGES | 1-2 | 2-3 | 3-4 | 4-5 | 5-6 | 6-7 | 7-8 | 8-9 | 9-10 | 10-11 | 11-12 |
| TOOTH POSITIONS | 165-138 | 165-138 | 165-138 | 165-138 | 165-138 | 165-138 | 165-137 | 165-135 | 165-132 | 165-130 | 165-129 |
| SPACING | 27 | 27 | 27 | 27 | 27 | 27 | 28 | 30 | 33 | 35 | 36 |

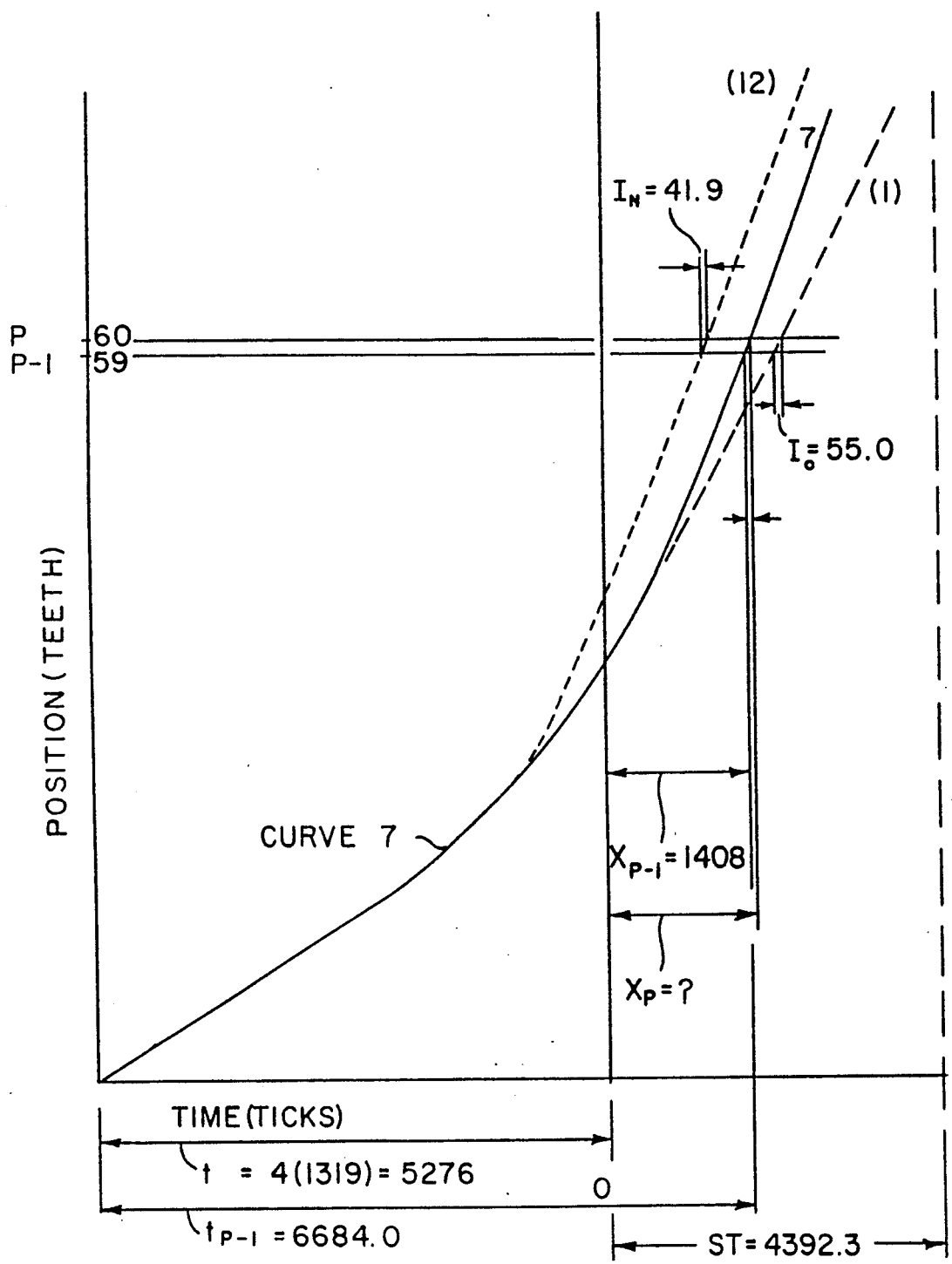

FIG. 8A

| Tooth | Carriage Number → | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 0.0 | 0.0 | 0.0 | 0.0 | 0.0 | 0.0 | 0.0 | 0.0 | 0.0 | 0.0 | 0.0 | 0.0 |
| 1 | 146.6 | 146.6 | 146.6 | 146.6 | 146.6 | 146.6 | 146.6 | 146.6 | 146.6 | 146.6 | 146.6 | 146.6 |
| 2 | 293.1 | 293.1 | 293.1 | 293.1 | 293.1 | 293.1 | 293.1 | 293.1 | 293.1 | 293.1 | 293.1 | 293.1 |
| 3 | 439.7 | 439.7 | 439.7 | 439.7 | 439.7 | 439.7 | 439.7 | 439.7 | 439.7 | 439.7 | 439.7 | 439.7 |
| 4 | 586.2 | 586.2 | 586.2 | 586.2 | 586.2 | 586.2 | 586.2 | 586.2 | 586.2 | 586.2 | 586.2 | 586.2 |
| 5 | 732.8 | 732.8 | 732.8 | 732.8 | 732.8 | 732.8 | 732.8 | 732.8 | 732.8 | 732.8 | 732.8 | 732.8 |
| 6 | 879.3 | 879.3 | 879.3 | 879.3 | 879.3 | 879.3 | 879.3 | 879.3 | 879.3 | 879.3 | 879.3 | 879.3 |
| 7 | 1025.9 | 1025.9 | 1025.9 | 1025.9 | 1025.9 | 1025.9 | 1025.9 | 1025.9 | 1025.9 | 1025.9 | 1025.9 | 1025.9 |
| 8 | 1172.4 | 1172.4 | 1172.4 | 1172.4 | 1172.4 | 1172.4 | 1172.4 | 1172.4 | 1172.4 | 1172.4 | 1172.4 | 1172.4 |
| 9 | 1319.0 | 1319.0 | 1319.0 | 1319.0 | 1319.0 | 1319.0 | 1319.0 | 1319.0 | 1319.0 | 1319.0 | 1319.0 | 1319.0 |
| 10 | 1465.6 | 1465.6 | 1465.6 | 1465.6 | 1465.6 | 1465.6 | 1465.6 | 1465.6 | 1465.6 | 1465.6 | 1465.6 | 1465.6 |
| 11 | 1612.1 | 1612.1 | 1612.1 | 1612.1 | 1612.1 | 1612.1 | 1612.1 | 1612.1 | 1612.1 | 1612.1 | 1612.1 | 1612.1 |
| 12 | 1758.7 | 1758.7 | 1758.7 | 1758.7 | 1758.7 | 1758.7 | 1758.7 | 1758.7 | 1758.7 | 1758.7 | 1758.7 | 1758.7 |
| 13 | 1905.2 | 1905.2 | 1905.2 | 1905.2 | 1905.2 | 1905.2 | 1905.2 | 1905.2 | 1905.2 | 1905.2 | 1905.2 | 1905.2 |
| 14 | 2051.8 | 2051.8 | 2051.8 | 2051.8 | 2051.8 | 2051.8 | 2051.8 | 2051.8 | 2051.8 | 2051.8 | 2051.8 | 2051.8 |
| 15 | 2198.3 | 2198.3 | 2198.3 | 2198.3 | 2198.3 | 2198.3 | 2198.3 | 2198.3 | 2198.3 | 2198.3 | 2198.3 | 2198.3 |
| 16 | 2344.9 | 2344.9 | 2344.9 | 2344.9 | 2344.9 | 2344.9 | 2344.9 | 2344.9 | 2344.9 | 2344.9 | 2344.9 | 2344.9 |
| 17 | 2491.4 | 2491.4 | 2491.4 | 2491.4 | 2491.4 | 2491.4 | 2491.4 | 2491.4 | 2491.4 | 2491.4 | 2491.4 | 2491.4 |
| 18 | 2638.0 | 2638.0 | 2638.0 | 2638.0 | 2638.0 | 2638.0 | 2638.0 | 2638.0 | 2638.0 | 2638.0 | 2638.0 | 2638.0 |
| 19 | 2784.6 | 2784.6 | 2784.6 | 2784.6 | 2784.6 | 2784.6 | 2784.6 | 2784.6 | 2784.6 | 2784.6 | 2784.6 | 2784.6 |
| 20 | 2931.1 | 2931.1 | 2931.1 | 2931.1 | 2931.1 | 2931.1 | 2931.1 | 2931.1 | 2931.1 | 2931.1 | 2931.1 | 2931.1 |
| 21 | 3077.7 | 3077.7 | 3077.7 | 3077.7 | 3077.7 | 3077.7 | 3077.7 | 3077.7 | 3077.7 | 3077.7 | 3077.7 | 3077.7 |
| 22 | 3224.2 | 3224.2 | 3224.2 | 3224.2 | 3224.2 | 3224.2 | 3224.2 | 3224.2 | 3224.2 | 3224.2 | 3224.2 | 3224.2 |
| 23 | 3370.8 | 3370.8 | 3370.8 | 3370.8 | 3370.8 | 3370.8 | 3370.8 | 3370.8 | 3370.8 | 3370.8 | 3370.8 | 3370.8 |
| 24 | 3517.3 | 3517.3 | 3517.3 | 3517.3 | 3517.3 | 3517.3 | 3517.3 | 3517.3 | 3517.3 | 3517.3 | 3517.3 | 3517.3 |
| 25 | 3663.9 | 3663.9 | 3663.9 | 3663.9 | 3663.9 | 3663.9 | 3663.9 | 3663.9 | 3663.9 | 3663.9 | 3663.9 | 3663.9 |
| 26 | 3810.4 | 3810.4 | 3810.4 | 3810.4 | 3810.4 | 3810.4 | 3810.4 | 3810.4 | 3810.4 | 3810.4 | 3810.4 | 3810.4 |
| 27 | 3957.0 | 3957.0 | 3957.0 | 3957.0 | 3957.0 | 3957.0 | 3957.0 | 3957.0 | 3957.0 | 3957.0 | 3957.0 | 3957.0 |

FIG. 8A (continued)

| | | | | | | | | | | | |
|---|---|---|---|---|---|---|---|---|---|---|---|
| 28 | 4099.9 | 4099.9 | 4099.9 | 4099.9 | 4099.9 | 4099.9 | 4099.9 | 4099.4 | 4098.9 | 4098.4 | 4098.2 |
| 29 | 4236.0 | 4236.0 | 4236.0 | 4236.0 | 4236.0 | 4236.0 | 4235.9 | 4234.0 | 4232.0 | 4230.1 | 4229.6 |
| 30 | 4366.0 | 4366.0 | 4366.0 | 4366.0 | 4366.0 | 4366.0 | 4365.4 | 4361.4 | 4357.4 | 4353.4 | 4352.6 |
| 31 | 4490.2 | 4490.2 | 4490.2 | 4490.2 | 4490.2 | 4490.2 | 4488.8 | 4482.2 | 4475.6 | 4468.9 | 4468.1 |
| 32 | 4609.3 | 4609.3 | 4609.3 | 4609.3 | 4609.3 | 4609.3 | 4606.7 | 4597.0 | 4587.3 | 4577.8 | 4577.0 |
| 33 | 4723.7 | 4723.7 | 4723.7 | 4723.7 | 4723.7 | 4723.7 | 4719.3 | 4706.3 | 4693.3 | 4680.8 | 4680.0 |
| 34 | 4833.6 | 4833.6 | 4833.6 | 4833.6 | 4833.6 | 4833.6 | 4827.2 | 4810.5 | 4793.8 | 4778.5 | 4777.7 |
| 35 | 4939.4 | 4939.4 | 4939.4 | 4939.4 | 4939.4 | 4939.4 | 4930.5 | 4910.0 | 4889.5 | 4871.4 | 4870.7 |
| 36 | 5041.5 | 5041.5 | 5041.5 | 5041.5 | 5041.5 | 5041.5 | 5029.6 | 5005.1 | 4980.6 | 4960.1 | 4959.3 |
| 37 | 5140.1 | 5140.1 | 5140.1 | 5140.1 | 5140.1 | 5140.1 | 5124.7 | 5096.2 | 5067.6 | 5044.8 | 5044.0 |
| 38 | 5235.3 | 5235.3 | 5235.3 | 5235.3 | 5235.3 | 5235.3 | 5216.2 | 5183.5 | 5150.8 | 5125.9 | 5125.1 |
| 39 | 5327.5 | 5327.5 | 5327.5 | 5327.5 | 5327.5 | 5327.5 | 5304.3 | 5267.4 | 5230.5 | 5203.6 | 5202.9 |
| 40 | 5416.9 | 5416.9 | 5416.9 | 5416.9 | 5416.9 | 5416.7 | 5389.1 | 5348.0 | 5306.8 | 5278.4 | 5277.6 |
| 41 | 5503.5 | 5503.5 | 5503.5 | 5503.5 | 5503.5 | 5502.8 | 5471.0 | 5425.5 | 5380.1 | 5350.3 | 5349.5 |
| 42 | 5587.5 | 5587.5 | 5587.5 | 5587.5 | 5587.5 | 5586.1 | 5549.9 | 5500.2 | 5450.5 | 5419.5 | 5418.8 |
| 43 | 5669.2 | 5669.2 | 5669.2 | 5669.2 | 5669.2 | 5666.7 | 5626.2 | 5572.2 | 5518.2 | 5486.4 | 5485.6 |
| 44 | 5748.6 | 5748.6 | 5748.6 | 5748.6 | 5748.6 | 5744.8 | 5700.0 | 5641.7 | 5583.5 | 5551.0 | 5550.2 |
| 45 | 5825.8 | 5825.8 | 5825.8 | 5825.8 | 5825.8 | 5820.5 | 5771.4 | 5708.9 | 5646.4 | 5613.5 | 5612.7 |
| 46 | 5901.0 | 5901.0 | 5901.0 | 5901.0 | 5901.0 | 5893.9 | 5840.5 | 5773.8 | 5707.1 | 5674.0 | 5673.2 |
| 47 | 5974.3 | 5974.3 | 5974.3 | 5974.3 | 5974.3 | 5965.1 | 5907.5 | 5836.6 | 5765.7 | 5732.6 | 5731.8 |
| 48 | 6045.8 | 6045.8 | 6045.8 | 6045.8 | 6045.8 | 6034.3 | 5972.5 | 5897.5 | 5822.6 | 5789.5 | 5788.7 |
| 49 | 6115.5 | 6115.5 | 6115.5 | 6115.5 | 6115.5 | 6101.5 | 6035.6 | 5956.5 | 5877.8 | 5844.7 | 5843.9 |
| 50 | 6183.5 | 6183.5 | 6183.5 | 6183.5 | 6183.5 | 6166.8 | 6096.8 | 6013.7 | 5931.5 | 5898.4 | 5897.6 |
| 51 | 6250.0 | 6250.0 | 6250.0 | 6250.0 | 6250.0 | 6230.4 | 6156.4 | 6069.2 | 5983.7 | 5950.6 | 5949.8 |
| 52 | 6314.9 | 6314.9 | 6314.9 | 6314.9 | 6314.9 | 6292.3 | 6214.2 | 6123.1 | 6034.5 | 6001.4 | 6000.6 |
| 53 | 6378.4 | 6378.4 | 6378.4 | 6378.4 | 6378.4 | 6352.5 | 6270.5 | 6175.5 | 6084.0 | 6050.9 | 6050.1 |
| 54 | 6440.6 | 6440.6 | 6440.6 | 6440.6 | 6440.6 | 6411.3 | 6325.4 | 6226.4 | 6132.3 | 6099.1 | 6098.3 |
| 55 | 6501.4 | 6501.4 | 6501.4 | 6501.4 | 6501.4 | 6468.5 | 6378.8 | 6276.0 | 6179.3 | 6146.1 | 6145.4 |
| 56 | 6560.9 | 6560.9 | 6560.9 | 6560.9 | 6560.9 | 6524.4 | 6430.8 | 6324.3 | 6225.2 | 6192.0 | 6191.3 |
| 57 | 6619.2 | 6619.2 | 6619.2 | 6619.2 | 6619.2 | 6578.9 | 6481.5 | 6371.3 | 6270.0 | 6236.9 | 6236.1 |
| 58 | 6676.4 | 6676.4 | 6676.4 | 6676.4 | 6676.4 | 6632.1 | 6531.0 | 6417.1 | 6313.8 | 6280.7 | 6279.9 |
| 59 | 6732.4 | 6732.4 | 6732.4 | 6732.4 | 6732.4 | 6684.0 | 6579.3 | 6461.8 | 6356.7 | 6323.5 | 6322.7 |
| 60 | 6787.4 | 6787.4 | 6787.4 | 6787.4 | 6787.4 | 6734.8 | 6626.5 | 6505.4 | 6398.5 | 6365.4 | 6364.6 |

FIG. 8B

| Tooth | Carriage Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 61 | 6841.3 | 6841.3 | 6841.3 | 6841.3 | 6841.3 | 6840.0 | 6784.4 | 6672.5 | 6547.9 | 6439.5 | 6406.3 | 6405.6 |
| 62 | 6894.2 | 6894.2 | 6894.2 | 6894.2 | 6894.2 | 6892.2 | 6832.9 | 6717.5 | 6589.4 | 6479.6 | 6446.5 | 6445.7 |
| 63 | 6946.2 | 6946.2 | 6946.2 | 6946.2 | 6946.2 | 6943.3 | 6880.4 | 6761.5 | 6630.0 | 6518.9 | 6485.7 | 6485.0 |
| 64 | 6997.2 | 6997.2 | 6997.2 | 6997.2 | 6997.2 | 6993.4 | 6926.9 | 6804.6 | 6669.6 | 6557.4 | 6524.2 | 6523.5 |
| 65 | 7047.4 | 7047.4 | 7047.4 | 7047.4 | 7047.4 | 7042.4 | 6972.3 | 6846.7 | 6708.4 | 6595.1 | 6562.0 | 6561.2 |
| 66 | 7096.7 | 7096.7 | 7096.7 | 7096.7 | 7096.7 | 7090.4 | 7016.9 | 6887.9 | 6746.3 | 6632.1 | 6599.0 | 6598.2 |
| 67 | 7145.5 | 7145.5 | 7145.5 | 7145.5 | 7145.5 | 7137.9 | 7060.9 | 6928.6 | 6783.7 | 6668.8 | 6635.6 | 6634.8 |
| 68 | 7194.4 | 7194.4 | 7194.4 | 7194.4 | 7194.4 | 7185.2 | 7104.8 | 6969.2 | 6821.1 | 6705.4 | 6672.2 | 6671.5 |
| 69 | 7243.2 | 7243.2 | 7243.2 | 7243.2 | 7243.2 | 7232.5 | 7148.6 | 7009.7 | 6858.3 | 6742.0 | 6708.9 | 6708.1 |
| 70 | 7292.1 | 7292.1 | 7292.1 | 7292.1 | 7292.1 | 7279.5 | 7192.2 | 7050.0 | 6895.4 | 6778.7 | 6745.5 | 6744.8 |
| 71 | 7340.9 | 7340.9 | 7340.9 | 7340.9 | 7340.9 | 7326.5 | 7235.7 | 7090.3 | 6932.5 | 6815.3 | 6782.1 | 6781.4 |
| 72 | 7389.8 | 7389.8 | 7389.8 | 7389.8 | 7389.8 | 7373.3 | 7279.2 | 7130.4 | 6969.4 | 6851.9 | 6818.8 | 6818.0 |
| 73 | 7438.6 | 7438.6 | 7438.6 | 7438.6 | 7438.6 | 7420.0 | 7322.4 | 7170.5 | 7006.2 | 6888.6 | 6855.4 | 6854.7 |
| 74 | 7487.5 | 7487.5 | 7487.5 | 7487.5 | 7487.5 | 7466.6 | 7365.6 | 7210.4 | 7042.8 | 6925.2 | 6892.1 | 6891.3 |
| 75 | 7536.3 | 7536.3 | 7536.3 | 7536.3 | 7536.3 | 7513.0 | 7408.7 | 7250.2 | 7079.5 | 6961.9 | 6928.7 | 6927.9 |
| 76 | 7585.2 | 7585.2 | 7585.2 | 7585.2 | 7585.2 | 7559.3 | 7451.6 | 7289.9 | 7116.1 | 6998.5 | 6965.3 | 6964.6 |
| 77 | 7634.0 | 7634.0 | 7634.0 | 7634.0 | 7634.0 | 7605.5 | 7494.4 | 7329.5 | 7152.8 | 7035.1 | 7002.0 | 7001.2 |
| 78 | 7682.9 | 7682.9 | 7682.9 | 7682.9 | 7682.9 | 7651.5 | 7537.1 | 7369.0 | 7189.4 | 7071.8 | 7038.6 | 7037.9 |
| 79 | 7731.7 | 7731.7 | 7731.7 | 7731.7 | 7731.7 | 7697.6 | 7579.7 | 7408.4 | 7226.0 | 7108.4 | 7075.3 | 7074.5 |
| 80 | 7780.6 | 7780.6 | 7780.6 | 7780.6 | 7780.6 | 7743.7 | 7622.1 | 7447.6 | 7262.7 | 7145.1 | 7111.9 | 7111.1 |
| 81 | 7829.4 | 7829.4 | 7829.4 | 7829.4 | 7829.4 | 7788.9 | 7664.4 | 7486.8 | 7299.3 | 7181.7 | 7148.5 | 7147.8 |
| 82 | 7878.3 | 7878.3 | 7878.3 | 7878.3 | 7878.3 | 7834.4 | 7706.7 | 7525.8 | 7336.0 | 7218.3 | 7185.2 | 7184.4 |
| 83 | 7927.1 | 7927.1 | 7927.1 | 7927.1 | 7927.1 | 7879.8 | 7748.8 | 7564.8 | 7372.6 | 7255.0 | 7221.8 | 7221.1 |
| 84 | 7976.0 | 7976.0 | 7976.0 | 7976.0 | 7975.9 | 7925.1 | 7790.7 | 7603.6 | 7409.2 | 7291.6 | 7258.5 | 7257.7 |
| 85 | 8024.8 | 8024.8 | 8024.8 | 8024.8 | 8024.6 | 7970.3 | 7832.6 | 7642.5 | 7445.9 | 7328.3 | 7295.1 | 7294.3 |
| 86 | 8073.7 | 8073.7 | 8073.7 | 8073.7 | 8073.2 | 8015.3 | 7874.4 | 7681.0 | 7482.5 | 7364.9 | 7331.7 | 7331.0 |
| 87 | 8122.5 | 8122.5 | 8122.5 | 8122.5 | 8121.6 | 8060.2 | 7916.0 | 7719.5 | 7519.2 | 7401.5 | 7368.4 | 7367.6 |
| 88 | 8171.4 | 8171.4 | 8171.4 | 8171.4 | 8169.9 | 8105.3 | 7957.5 | 7757.9 | 7555.8 | 7438.2 | 7405.0 | 7404.3 |
| 89 | 8220.2 | 8220.2 | 8220.2 | 8220.2 | 8218.0 | 8149.6 | 7998.9 | 7796.2 | 7592.4 | 7474.8 | 7441.6 | 7440.9 |
| 90 | 8269.1 | 8269.1 | 8269.1 | 8269.1 | 8266.0 | 8194.2 | 8040.2 | 7834.3 | 7629.1 | 7511.4 | 7478.3 | 7477.5 |

FIG. 8B (continued)

| | | | | | | | | | |
|---|---|---|---|---|---|---|---|---|---|
| 91 | 8317.9 | 8317.9 | 8317.9 | 8313.9 | 8238.6 | 8081.4 | 7872.4 | 7665.7 | 7548.1 | 7514.9 | 7514.2 |
| 92 | 8366.8 | 8366.8 | 8366.8 | 8361.6 | 8282.9 | 8122.4 | 7910.4 | 7702.3 | 7584.7 | 7551.6 | 7550.8 |
| 93 | 8415.7 | 8415.7 | 8415.7 | 8409.2 | 8327.0 | 8163.4 | 7948.3 | 7739.0 | 7621.4 | 7588.2 | 7587.4 |
| 94 | 8464.5 | 8464.5 | 8464.5 | 8456.7 | 8371.1 | 8204.2 | 7986.0 | 7775.6 | 7658.0 | 7624.8 | 7624.1 |
| 95 | 8513.4 | 8513.4 | 8513.4 | 8504.0 | 8415.0 | 8244.9 | 8023.7 | 7812.3 | 7694.6 | 7661.5 | 7660.7 |
| 96 | 8562.2 | 8562.2 | 8562.2 | 8551.3 | 8458.8 | 8285.5 | 8061.3 | 7848.9 | 7731.3 | 7698.1 | 7697.4 |
| 97 | 8611.1 | 8611.1 | 8611.1 | 8598.3 | 8502.5 | 8326.0 | 8098.7 | 7885.5 | 7767.9 | 7734.8 | 7734.0 |
| 98 | 8659.9 | 8659.9 | 8659.9 | 8645.3 | 8546.0 | 8366.4 | 8136.0 | 7922.2 | 7804.6 | 7771.4 | 7770.6 |
| 99 | 8708.8 | 8708.8 | 8708.8 | 8692.1 | 8589.4 | 8406.7 | 8173.3 | 7958.8 | 7841.2 | 7808.0 | 7807.3 |
| 100 | 8757.6 | 8757.6 | 8757.6 | 8738.8 | 8632.8 | 8446.8 | 8210.4 | 7995.5 | 7877.8 | 7844.7 | 7843.9 |
| 101 | 8806.5 | 8806.5 | 8806.5 | 8785.4 | 8675.9 | 8486.9 | 8247.5 | 8032.1 | 7914.5 | 7881.3 | 7880.6 |
| 102 | 8855.3 | 8855.3 | 8855.3 | 8831.8 | 8719.0 | 8526.8 | 8284.4 | 8068.7 | 7951.1 | 7918.0 | 7917.2 |
| 103 | 8904.2 | 8904.2 | 8904.2 | 8878.1 | 8762.0 | 8566.6 | 8321.2 | 8105.4 | 7987.8 | 7954.6 | 7953.8 |
| 104 | 8953.0 | 8953.0 | 8953.0 | 8924.3 | 8804.8 | 8606.3 | 8357.9 | 8142.0 | 8024.4 | 7991.2 | 7990.5 |
| 105 | 9001.9 | 9001.9 | 9001.9 | 8970.3 | 8847.5 | 8645.9 | 8394.5 | 8178.7 | 8061.0 | 8027.9 | 8027.1 |
| 106 | 9050.7 | 9050.7 | 9050.7 | 9016.2 | 8890.1 | 8685.4 | 8431.2 | 8215.3 | 8097.7 | 8064.5 | 8063.8 |
| 107 | 9099.6 | 9099.6 | 9099.6 | 9062.0 | 8932.6 | 8724.8 | 8467.8 | 8251.9 | 8134.3 | 8101.1 | 8100.4 |
| 108 | 9148.4 | 9148.4 | 9148.4 | 9107.7 | 8974.9 | 8764.1 | 8504.4 | 8288.6 | 8170.9 | 8137.8 | 8137.0 |
| 109 | 9197.3 | 9197.3 | 9197.3 | 9153.2 | 9017.2 | 8803.2 | 8541.1 | 8325.2 | 8207.6 | 8174.4 | 8173.7 |
| 110 | 9246.1 | 9246.1 | 9246.1 | 9198.6 | 9059.3 | 8842.3 | 8577.7 | 8361.8 | 8244.2 | 8211.1 | 8210.3 |
| 111 | 9295.0 | 9295.0 | 9294.9 | 9243.9 | 9101.3 | 8881.2 | 8614.3 | 8398.5 | 8280.9 | 8247.7 | 8246.9 |
| 112 | 9343.8 | 9343.8 | 9343.6 | 9289.1 | 9143.2 | 8920.1 | 8651.0 | 8435.1 | 8317.5 | 8284.3 | 8283.6 |
| 113 | 9392.7 | 9392.7 | 9392.2 | 9334.1 | 9185.0 | 8958.8 | 8687.6 | 8471.8 | 8354.1 | 8321.0 | 8320.2 |
| 114 | 9441.5 | 9441.5 | 9440.6 | 9379.0 | 9226.6 | 8997.4 | 8724.3 | 8508.4 | 8390.8 | 8357.6 | 8356.9 |
| 115 | 9490.4 | 9490.4 | 9488.9 | 9423.8 | 9268.2 | 9035.9 | 8760.9 | 8545.0 | 8427.4 | 8394.3 | 8393.5 |
| 116 | 9539.2 | 9539.2 | 9537.0 | 9468.5 | 9309.6 | 9074.4 | 8797.5 | 8581.7 | 8464.1 | 8430.9 | 8430.1 |
| 117 | 9588.1 | 9588.1 | 9585.0 | 9513.0 | 9350.9 | 9112.7 | 8834.2 | 8618.3 | 8500.7 | 8467.5 | 8466.8 |
| 118 | 9636.9 | 9636.9 | 9632.9 | 9557.4 | 9392.1 | 9150.8 | 8870.8 | 8655.0 | 8537.3 | 8504.2 | 8503.4 |
| 119 | 9685.8 | 9685.8 | 9680.6 | 9601.7 | 9433.2 | 9188.9 | 8907.5 | 8691.6 | 8574.0 | 8540.8 | 8540.1 |
| 120 | 9734.7 | 9734.7 | 9728.2 | 9645.9 | 9474.2 | 9226.9 | 8944.1 | 8728.2 | 8610.6 | 8577.5 | 8576.7 |
| 121 | 9783.5 | 9783.5 | 9775.7 | 9689.9 | 9515.0 | 9264.8 | 8980.7 | 8764.9 | 8647.3 | 8614.1 | 8613.3 |

FIG. 8C

| Tooth | Carriage Number → | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 122 | 9832.4 | 9832.4 | 9832.4 | 9823.0 | 9733.8 | 9555.8 | 9302.6 | 9017.4 | 8801.5 | 8683.9 | 8650.7 | 8650.0 |
| 123 | 9881.2 | 9881.2 | 9881.2 | 9870.3 | 9777.6 | 9596.4 | 9340.2 | 9054.0 | 8838.2 | 8720.5 | 8687.4 | 8686.6 |
| 124 | 9930.1 | 9930.1 | 9930.1 | 9917.3 | 9821.3 | 9636.9 | 9377.8 | 9090.7 | 8874.8 | 8757.2 | 8724.0 | 8723.3 |
| 125 | 9978.9 | 9978.9 | 9978.9 | 9964.3 | 9864.8 | 9677.3 | 9415.3 | 9127.3 | 8911.4 | 8793.8 | 8760.6 | 8759.9 |
| 126 | 10027.8 | 10027.8 | 10027.8 | 10011.1 | 9908.3 | 9717.6 | 9452.6 | 9163.9 | 8948.1 | 8830.4 | 8797.3 | 8796.5 |
| 127 | 10076.6 | 10076.6 | 10076.6 | 10057.8 | 9951.6 | 9757.8 | 9489.9 | 9200.6 | 8984.7 | 8867.1 | 8833.9 | 8833.2 |
| 128 | 10125.5 | 10125.5 | 10125.5 | 10104.4 | 9994.8 | 9797.8 | 9527.0 | 9237.2 | 9021.3 | 8903.7 | 8870.6 | 8869.8 |
| 129 | 10174.3 | 10174.3 | 10174.3 | 10150.8 | 10037.8 | 9837.8 | 9564.1 | 9273.8 | 9058.0 | 8940.4 | 8907.2 | 8906.4 |
| 130 | 10223.2 | 10223.2 | 10223.2 | 10197.1 | 10080.8 | 9877.6 | 9601.0 | 9310.5 | 9094.6 | 8977.0 | 8943.8 | 8943.1 |
| 131 | 10272.0 | 10272.0 | 10272.0 | 10243.3 | 10123.6 | 9917.4 | 9637.8 | 9347.1 | 9131.3 | 9013.6 | 8980.5 | 8979.7 |
| 132 | 10320.9 | 10320.9 | 10320.9 | 10289.3 | 10166.3 | 9957.0 | 9674.5 | 9383.8 | 9167.9 | 9050.3 | 9017.1 | 9016.4 |
| 133 | 10369.7 | 10369.7 | 10369.7 | 10335.2 | 10208.9 | 9996.5 | 9711.1 | 9420.4 | 9204.5 | 9086.9 | 9053.8 | 9053.0 |
| 134 | 10418.6 | 10418.6 | 10418.6 | 10381.0 | 10251.4 | 10035.9 | 9747.7 | 9457.0 | 9241.2 | 9123.6 | 9090.4 | 9089.6 |
| 135 | 10467.4 | 10467.4 | 10467.4 | 10426.7 | 10293.8 | 10075.2 | 9784.4 | 9493.7 | 9277.8 | 9160.2 | 9127.0 | 9126.3 |
| 136 | 10516.3 | 10516.3 | 10516.3 | 10472.2 | 10336.0 | 10114.4 | 9821.0 | 9530.3 | 9314.5 | 9196.8 | 9163.7 | 9162.9 |
| 137 | 10565.1 | 10565.1 | 10565.1 | 10517.6 | 10378.1 | 10153.5 | 9857.7 | 9567.0 | 9351.1 | 9233.5 | 9200.3 | 9199.6 |
| 138 | 10614.0 | 10614.0 | 10613.9 | 10562.9 | 10420.1 | 10192.4 | 9894.3 | 9603.6 | 9387.7 | 9270.1 | 9237.0 | 9236.2 |
| 139 | 10662.8 | 10662.8 | 10662.6 | 10608.1 | 10462.0 | 10231.3 | 9930.9 | 9640.2 | 9424.4 | 9306.8 | 9273.6 | 9272.8 |
| 140 | 10711.7 | 10711.7 | 10711.2 | 10653.1 | 10503.8 | 10270.0 | 9967.6 | 9676.9 | 9461.0 | 9343.4 | 9310.2 | 9309.5 |
| 141 | 10760.5 | 10760.5 | 10759.6 | 10698.0 | 10545.5 | 10308.7 | 10004.2 | 9713.5 | 9497.7 | 9380.0 | 9346.9 | 9346.1 |

FIG. 8C (continued)

| | | | | | | | | | |
|---|---|---|---|---|---|---|---|---|---|
| 142 | 10809.4 | 10809.4 | 10807.9 | 10742.8 | 10587.0 | 10347.2 | 10040.9 | 9750.2 | 9534.3 | 9416.7 | 9383.5 | 9382.8 |
| 143 | 10858.2 | 10858.2 | 10856.0 | 10787.5 | 10628.4 | 10385.7 | 10077.5 | 9786.8 | 9570.9 | 9453.3 | 9420.1 | 9419.4 |
| 144 | 10907.1 | 10907.1 | 10904.0 | 10832.0 | 10669.8 | 10424.0 | 10114.1 | 9823.4 | 9607.6 | 9489.9 | 9456.8 | 9456.0 |
| 145 | 10955.9 | 10955.9 | 10951.9 | 10876.4 | 10710.9 | 10462.2 | 10150.8 | 9860.1 | 9644.2 | 9526.6 | 9493.4 | 9492.7 |
| 146 | 11004.8 | 11004.8 | 10999.6 | 10920.7 | 10752.0 | 10500.3 | 10187.4 | 9896.7 | 9680.8 | 9563.2 | 9530.1 | 9529.3 |
| 147 | 11053.7 | 11053.7 | 11047.2 | 10964.9 | 10793.0 | 10538.3 | 10224.1 | 9933.3 | 9717.5 | 9599.9 | 9566.7 | 9565.9 |
| 148 | 11102.5 | 11102.5 | 11094.7 | 11008.9 | 10833.9 | 10576.2 | 10260.7 | 9970.0 | 9754.1 | 9636.5 | 9603.3 | 9602.6 |
| 149 | 11151.4 | 11151.4 | 11142.0 | 11052.8 | 10874.6 | 10614.0 | 10297.3 | 10006.6 | 9790.8 | 9673.1 | 9640.0 | 9639.2 |
| 150 | 11200.2 | 11200.2 | 11189.3 | 11096.6 | 10915.2 | 10651.7 | 10334.0 | 10043.3 | 9827.4 | 9709.8 | 9676.6 | 9675.9 |
| 151 | 11249.1 | 11249.1 | 11236.3 | 11140.3 | 10955.7 | 10689.3 | 10370.6 | 10079.9 | 9864.0 | 9746.4 | 9713.3 | 9712.5 |
| 152 | 11297.9 | 11297.9 | 11283.3 | 11183.8 | 10996.1 | 10726.7 | 10407.2 | 10116.5 | 9900.7 | 9783.1 | 9749.9 | 9749.1 |
| 153 | 11346.8 | 11346.8 | 11330.1 | 11227.3 | 11036.4 | 10764.1 | 10443.9 | 10153.2 | 9937.3 | 9819.7 | 9786.5 | 9785.8 |
| 154 | 11395.6 | 11395.6 | 11376.8 | 11270.6 | 11076.6 | 10801.4 | 10480.5 | 10189.8 | 9974.0 | 9856.3 | 9823.2 | 9822.4 |
| 155 | 11444.5 | 11444.5 | 11423.4 | 11313.8 | 11116.7 | 10838.6 | 10517.2 | 10226.5 | 10010.6 | 9893.0 | 9859.8 | 9859.1 |
| 156 | 11493.3 | 11493.3 | 11469.8 | 11356.8 | 11156.6 | 10875.6 | 10553.8 | 10263.1 | 10047.2 | 9929.6 | 9896.5 | 9895.7 |
| 157 | 11542.2 | 11542.2 | 11516.1 | 11399.8 | 11196.5 | 10912.6 | 10590.4 | 10299.7 | 10083.9 | 9966.3 | 9933.1 | 9932.3 |
| 158 | 11591.0 | 11591.0 | 11562.3 | 11442.6 | 11236.2 | 10949.4 | 10627.1 | 10336.4 | 10120.5 | 10002.9 | 9969.7 | 9969.0 |
| 159 | 11639.9 | 11639.9 | 11608.3 | 11485.3 | 11275.8 | 10986.2 | 10663.7 | 10373.0 | 10157.2 | 10039.5 | 10006.4 | 10005.6 |
| 160 | 11688.7 | 11688.7 | 11654.2 | 11527.9 | 11315.3 | 11022.8 | 10700.4 | 10409.7 | 10193.8 | 10076.2 | 10043.0 | 10042.3 |
| 161 | 11737.6 | 11737.6 | 11700.0 | 11570.4 | 11354.8 | 11059.5 | 10737.0 | 10446.3 | 10230.4 | 10112.8 | 10079.6 | 10078.9 |
| 162 | 11786.4 | 11786.4 | 11745.7 | 11612.8 | 11394.0 | 11096.1 | 10773.6 | 10482.9 | 10267.1 | 10149.4 | 10116.3 | 10115.5 |
| 163 | 11835.3 | 11835.3 | 11791.2 | 11655.0 | 11433.2 | 11132.8 | 10810.3 | 10519.6 | 10303.7 | 10186.1 | 10152.9 | 10152.2 |
| 164 | 11884.1 | 11884.1 | 11836.6 | 11697.1 | 11472.3 | 11169.4 | 10846.9 | 10556.2 | 10340.3 | 10222.7 | 10189.6 | 10188.8 |
| 165 | 11933.0 | 11933.0 | 11881.9 | 11739.1 | 11511.3 | 11206.0 | 10883.6 | 10592.8 | 10377.0 | 10259.4 | 10226.2 | 10225.4 |

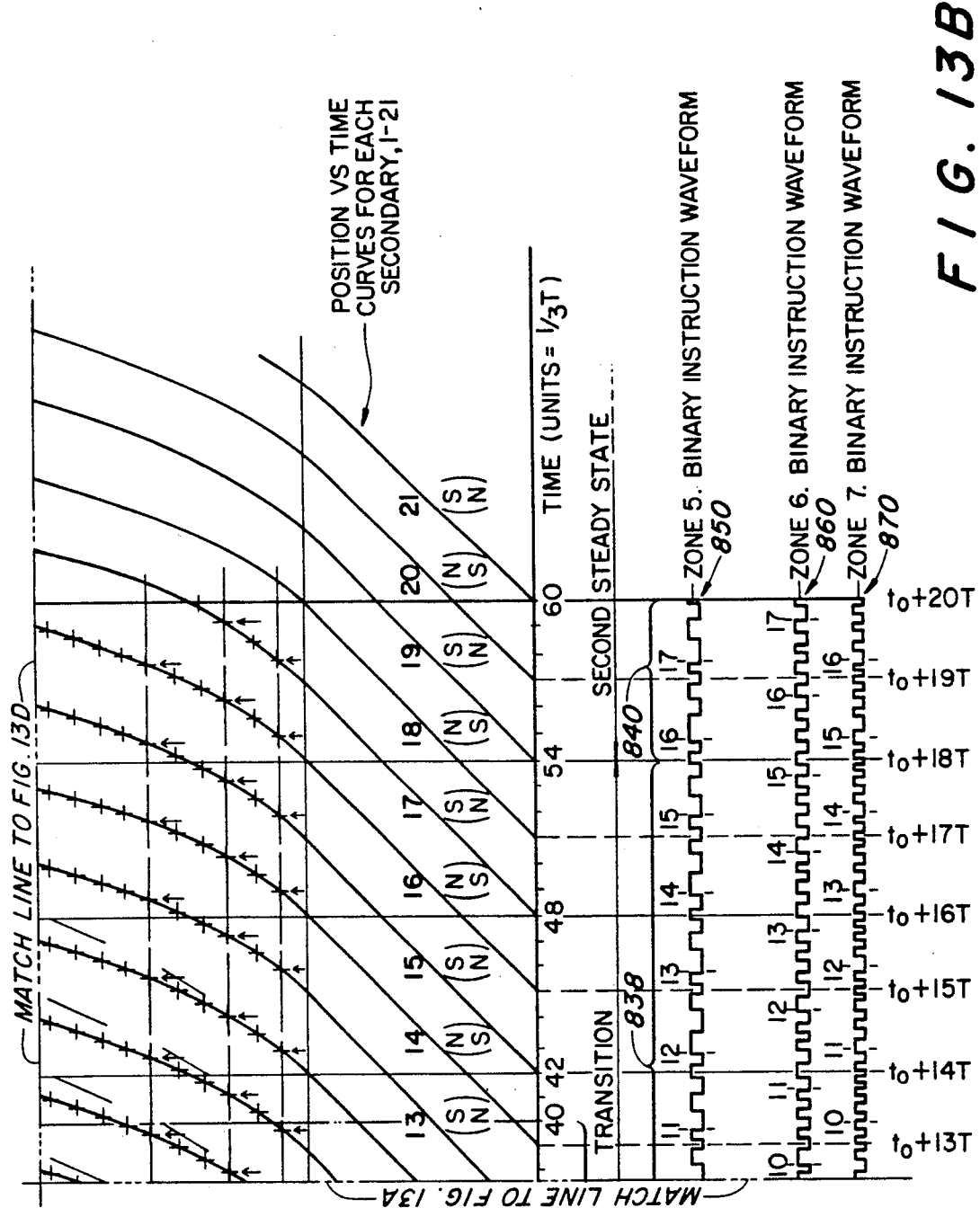

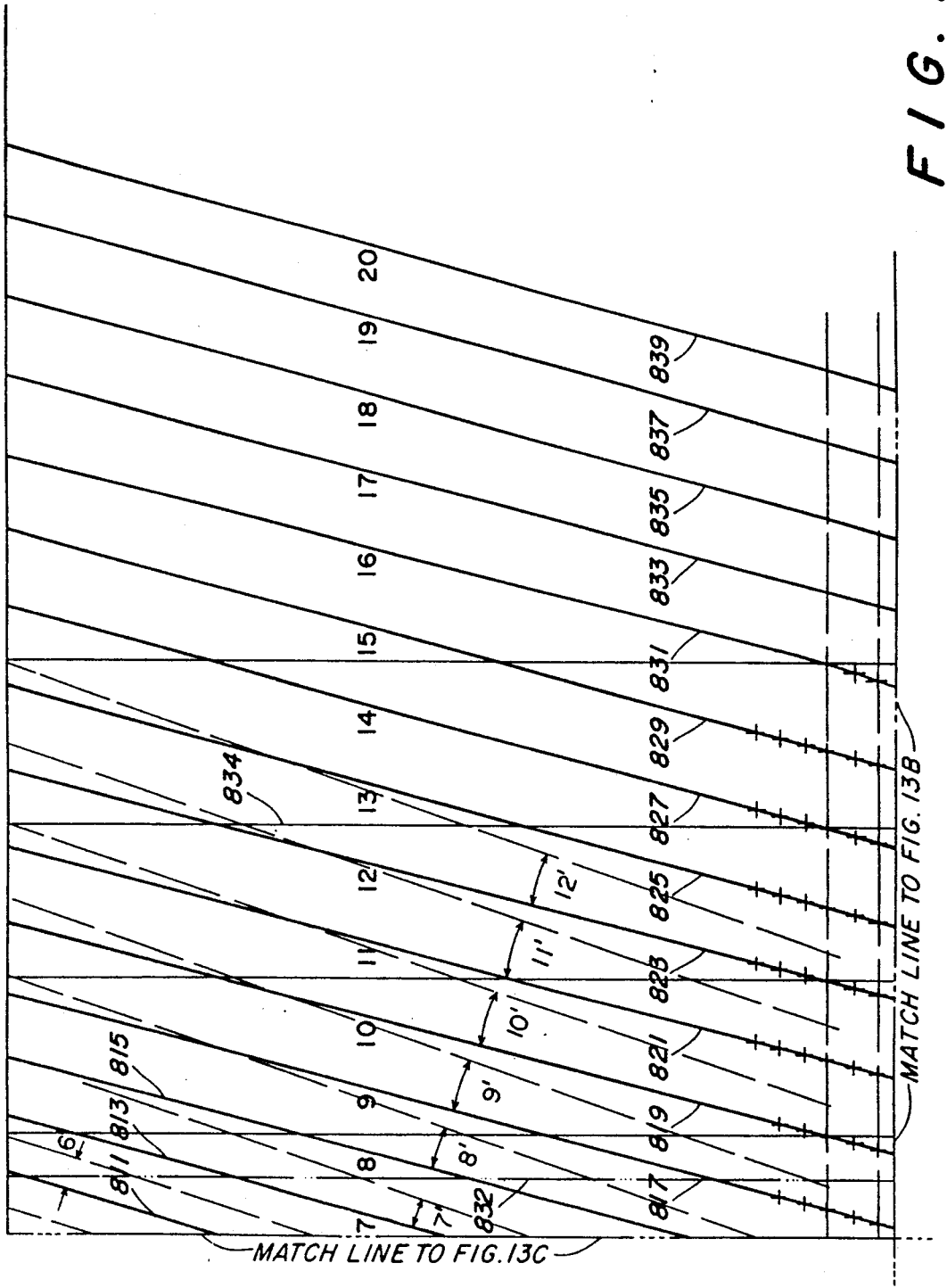

| ZONE DRIVER GATING LOGIC TABLE ||||||||||
|---|---|---|---|---|---|---|---|---|---|
| LOGIC STATE | INPUTS |||| OUTPUTS |||||
| | A | B | C | OT | A | $\bar{A}$ | B | $\bar{B}$ | C | $\bar{C}$ |
| OUTPUTS OFF | 0 | 0 | 0 | - | 0 | 0 | 0 | 0 | 0 | 0 |
| 0° - 60° | 1 | 0 | 1 | 1 | 1 | 0 | 0 | 1 | 1 | 0 |
| 60° - 120° | 1 | 0 | 0 | 1 | 1 | 0 | 0 | 1 | 0 | 1 |
| 120° - 180° | 1 | 1 | 0 | 1 | 1 | 0 | 1 | 0 | 0 | 1 |
| 180° - 240° | 0 | 1 | 0 | 1 | 0 | 1 | 1 | 0 | 0 | 1 |
| 240° - 300° | 0 | 1 | 1 | 1 | 0 | 1 | 1 | 0 | 1 | 0 |
| 300° - 360° | 0 | 0 | 1 | 1 | 0 | 1 | 0 | 1 | 1 | 0 |
| OUTPUT FAULT | - | - | - | | 0 | 0 | 0 | 0 | 0 | 0 |

FIG. 17

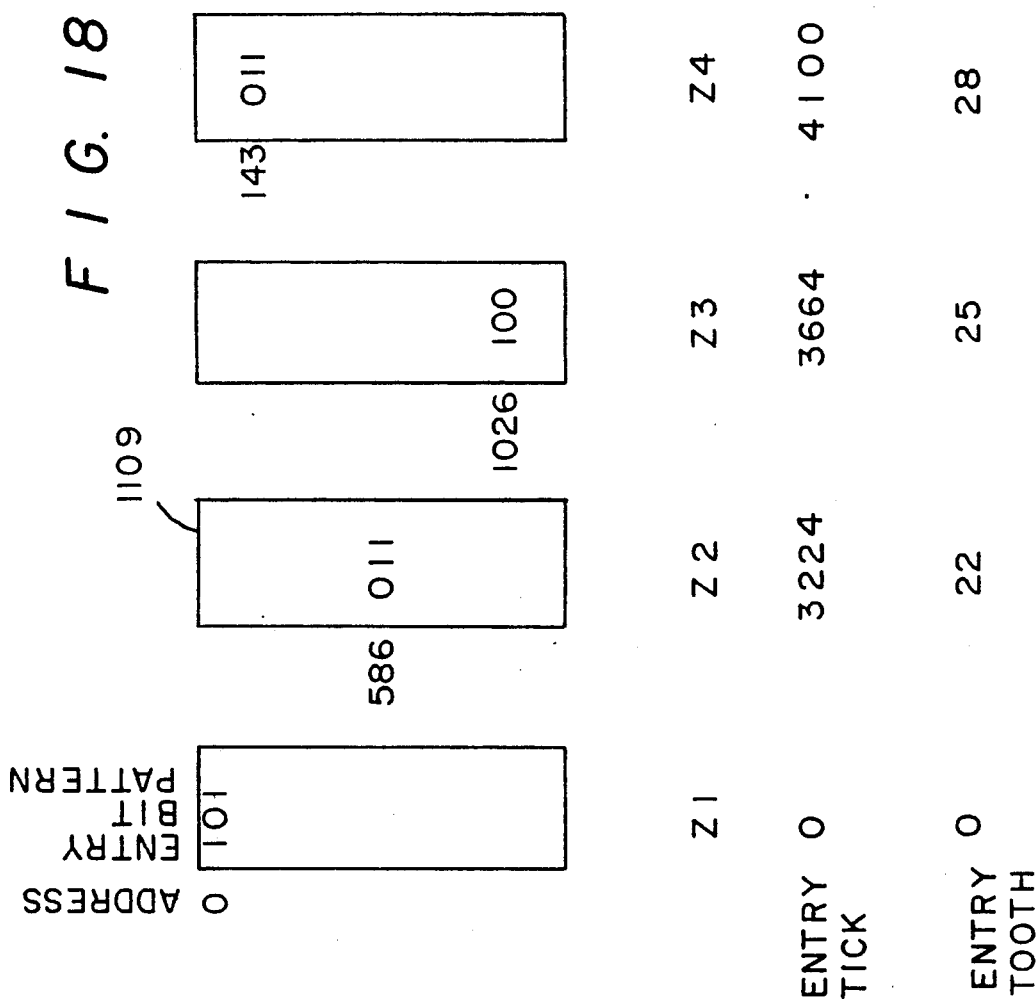

METHOD OF DETERMINING CONTROL INSTRUCTIONS

BACKGROUND OF THE INVENTION

There is a need for a simple quick method to determine control instructions for machines controlled by large quantities of calculated digital information. Such a machine is described in U.S. Pat. No. 4,675,582, hereby incorporated herein by reference, where a plurality of carriages are propelled independently by a system of synchronous linear motors. There is a need to be able to simply and quickly determine the control information for a first steady state operating condition and there is a need to be able to determine the control information required to transition from the first steady state condition to a second different condition while the machine continues to run; and there is a need to do the determining quickly on-line in response to changing conditions observed while operating the machine. For instance, a use for such a linear motor system is to power carriages in a film stretching tenter frame as described in more detail in U.S. patent application 07/209,910, hereby incorporated herein by reference, and the operating conditions of the machine need to be changed in response to the film characteristics observed as a result of the stretching operation. The control system for the tenter includes zones of control in the linear motor primary positioned along both sides of the tenter to electromagnetically engage synchronous secondaries attached to each independently powered pair of carriages. Discrete bits of control information comprising control instructions are stored in zone controller memories in the control system to repeatably develop the electromagnetic wave for each zone that is coordinated in time with the waves of the other zones to continuously propel the carriage pairs throughout the length of the tenter.

In the '582 patent, the linear synchronous motor control instructions for steady state and transition operation were derived from predetermined curves describing position versus time (t) in units of lambda versus T, where lambda = length of one pole pitch for an electrical phase and T = cycle time between secondaries entering the system. Analog equations for the curves were solved for phase as a function of discrete time intervals to determine the bits of information for three electrical phases to be stored in the memories of the zone controllers. For each whole lambda for a phase, there is a change in the binary instructions that will occur at some time T, calculated from the lambda vs t relationship. The information for a phase for a given zone memory can be expressed in a table of values of lambda versus t, where the value of lambda is shown in degrees, 180 degrees per lambda, and t is shown by some constant times T to equal seconds. This determination of data in degrees versus seconds, however, has been found to be less convenient to work with than the time in clock ticks from a central programmable time base for accessing the memory addresses, and the teeth of the three-phase primary structure which is the phase angle lowest common denominator for a six-step motor drive.

Obtaining this data by solving continuous, analog relationships describing the secondary position versus time has been found to be a time-consuming operation, sometimes requiring many minutes of computer time. This is particularly true when determining transition information, since unique curves must be developed for each of many carriages undergoing transition. All the data stored for the carriage profiles must be calculated. For example, for some applications this might amount to 750,000 individual values which when converted to bit patterns would amount to over 50,000,000 bits of data? These calculations are often required to be done during machine operation since transition often proceeds in several steps for significant speed ratio changes. A first step can be calculated off-line, but during the calculation time for subsequent steps, the product processed by the machine is often scrapped, so it is important that this time be minimized. Precalculating the data and downloading it from a storage disc is also a slow process requiring a large disk storage and does not lend itself to last minute changes in operating conditions.

SUMMARY OF THE INVENTION

The invention is a method of determining the steady state control instructions that are stored in memory in the zone controllers for a synchronous linear motor control system for independently propelling a plurality of linear motor secondaries, such as the synchronous linear motors for propelling the clip carriages of the tenter of the '910 application. The invention is also a method of rapidly determining the transition instructions for changing from one set of steady-state instructions to another. These methods provide a more rapid determination than the methods described in the '582 patent.

The methods of the invention are for developing discrete control information including the steps of:

representing the data describing the motion profile for each carriage in terms of memory address clock ticks versus linear motor primary teeth instead of degrees versus seconds;

determining the arrangement of data in a zone controller memory by performing a modulo operation on the profile motion data for each zone;

developing the overall motion profiles for steady state operation including complex acceleration portions by defining and combining individual segments of motion curves using a variety of predetermined continuous analog relationships;

determining the data for the many intermediate transition curves between steady states by proportionately distributing data points for each intermediate curve between the steady state data points, the proportion determined by a weighting function.

The methods of the invention for representing and developing the control data surprisingly produce excellent operating results and reduce the time for obtaining the data significantly, so much so that on-line calculation of the data is practical.

DESCRIPTION OF THE FIGURES

FIGS. 1, 1A–1E show a diagram of a linear motor primary divided into zones of control and some data positionally associated with the primary zones.

FIGS. 2, 2A–2F show an extension of FIG. 1 showing additional data positionally associated with the primary zones.

FIG. 4 is a table of information the operator may typically have which he wishes to incorporate into control instructions.

FIG. 6 is a table illustrating the carriage spacing between adjacent carriages undergoing transition at two different positions along the primary of the tenter.

FIG. 7 is a plot of time versus position of the current, new, and carriage 7 transition profiles.

FIGS. 8A-8C are tables of ticks to each tooth for the carriages involved in the transition between steady state profiles for a specific operating condition.

FIG. 17 is the same as FIG. 9 of the '582 patent which shows a logic truth table for the inputs and outputs of the driver logic circuit of the LSM zone driver.

FIG. 18 illustrates the location of the control bits in the zone memories for propelling a secondary over the first tooth of each zone.

DETAIL DISCUSSION OF THE FIGURES

STEADY STATE OPERATION

Figure 3:
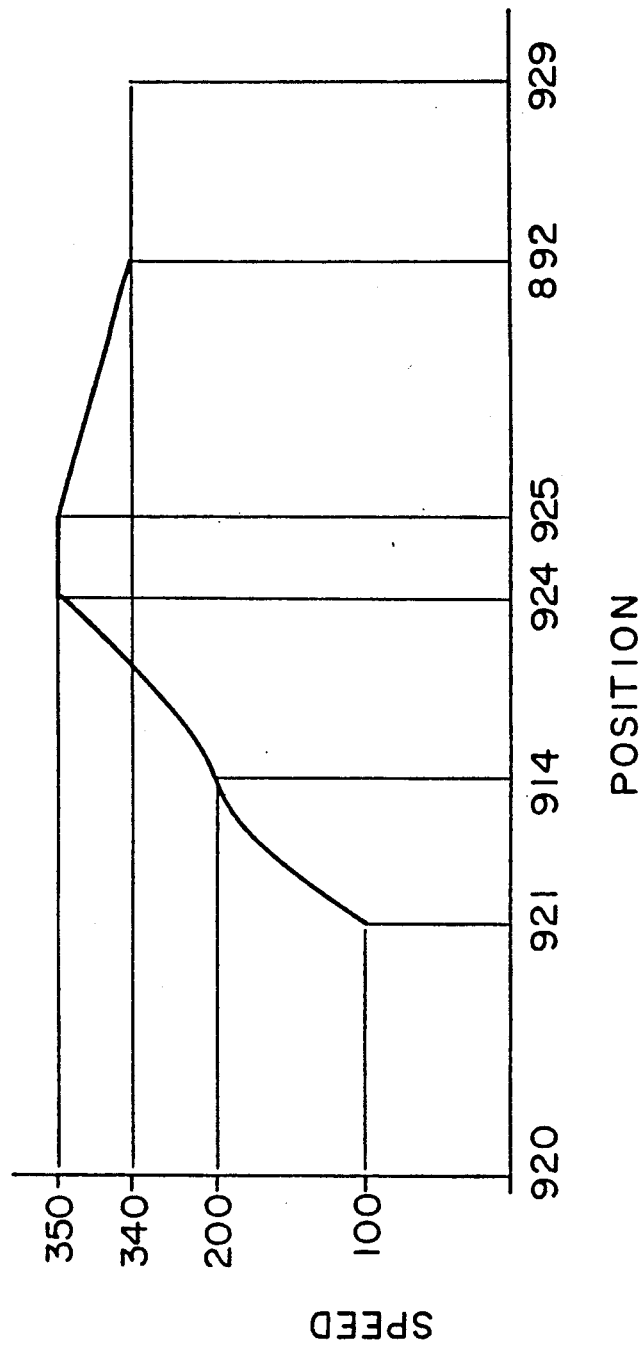
FIG. 3 is an illustrative plot of the speed of a carriage at different positions along the linear motor tenter frame.

In FIGS. 1, 1A-1E elongated block 1101 represents the primary structure and the numbers within the block are positions along the primary expressed in units of lambda. The block 1101 is divided into sub-blocks labeled Z1, Z2, Z3, etc. that represent the control divisions, or zones, of the primary. Position along the primary in terms of phase angle for the electromagnetic wave is shown under the column labeled "degrees". The time that a secondary reaches each phase angle or lambda position for a particular motion along the primary is shown in units of "T" under the column labeled "T". This information of lambda, or degrees, versus "T" is a common form the data was expressed in to describe the motion curves or motion profiles of FIG. 13 from the '582 patent. In the control system of the '582 patent, the switching instructions (inputs) to determine the transistor switch states for the three phases (outputs), are stored in the zone controller memories, as binary information in each memory address. One memory address is accessed for each clock tick. The table of FIG. 17 from the '582 patent shows the binary information or bit patterns for turning on and off the transistors in the six-step drives to develop the different phase angles of the three phase current to the coils in the primary. Since the three phase state remains the same for 60 degree increments at a time, for one cycle of phase (360 degrees), the resulting magnetic wave travels along six coils or six primary teeth. Therefore, one phase state change moves the electromagnetic (EM) wave one tooth.

It has been found that the determination of the control data can be simplified by calculating for each tooth the time that the secondary reaches that tooth (time versus position calculation). For other than a six-step method of synthesizing a power waveform, it may be convenient to specify fractions of a tooth and calculate the time to reach that fraction. In general, the term "tooth" is used to define the distance a secondary travels during the smallest step of the drive control logic. For an EM wave to engage a synchronous secondary and propel it completely through the system according to the position versus time curve 802 of FIG. 13 from the '582 patent, the time when the bit pattern must change to move the secondary to the next tooth is represented by the data in FIGS. 2, 2A-2F. The ticks column 1102 represents "carriage ticks" to propel a single carriage (secondary) completely along the length of the primary starting at zero ticks and ending when the carriage leaves the system. The scale for the ticks is selected based on the desired intervals for the constant "T", the time between successive secondaries entering the system, i.e., arriving over the first tooth of the primary. The scale is selected for good control resolution where one address in a zone control data memory is accessed for each tick. For instance, for T=1319 ticks, in column 1102 for ticks 0-146, the three phase bit pattern in column 1104 remains 1 0 1, and the secondary is just entering the system. For tick 147, the bit pattern changes to 1 0 0, and remains the same until tick 292. At tick 293, the bit pattern changes to 1 1 0. The EM wave and the engaged secondary have now moved over the second tooth. The ticks data in column 1102 was calculated to fractions of a tick for the motion profile of curve 802, but in use, the tick values are always rounded to a discrete value as shown in the expanded data in column 1106.

In order to propel a plurality of carriages along the primary simultaneously and independently, the primary is divided into zones for control according to the '582 patent. Where the carriages are spaced apart, the zones are selected so there is never more than one carriage in a zone at a time. The data for propelling a carriage through a zone is stored in a zone controller memory. In steady state operation, the information for a zone to propel the successive secondaries is the same, so for each control zone the information can be repeated for each secondary. The number of addresses in each memory is the same and the information to propel the secondary through a zone and beyond can be determined as illustrated in column 1102 of FIGS. 2, 2A-2F. In FIGS. 2, 2A-2F, column 1102, equal time intervals of "zone ticks", selected to be "T"=1319 ticks, are bracketed for each zone representing the information to be stored in memory for each zone. The scale for "carriage ticks" and "zone ticks" are the same. For instance, for zone 2, the time when a secondary reaches the beginning of zone 2 at tooth 22 is 3224 carriage ticks and the information for zone 2 ends 1319 ticks later at tick 4543. Similarly, the time when a secondary reaches the beginning of zone 3 at tooth 25 is 3664 ticks and the information for zone 3 ends 1319 ticks later at tick 4983. In real time, however, a secondary is not entering zone 2 at the same time a secondary is entering zone 3. When the information for zones 2 and 3 are output simultaneously, the zone 2 address for the bit pattern when the secondary first enters zone 2 will not be the same as the zone 3 address for the bit pattern when the secondary first enters zone three since this event will occur later in time. There is a problem determining where to place in zone two and three's memory the address for the data when the secondary first enters that zone. A system for determining this was described in the '582 patent and graphically shown in FIG. 13 from the patent. The system involved some lengthy calculations.

It has been determined that for each zone, the address for the information for propelling the secondary as it enters a zone (entry address) relative to the starting address can be determined by performing a modulo operation of the total zone ticks into the carriage ticks information in column 1102. In a mathematically defined modulo operation a first number is divided by a second number and a remainder is determined. The remainder is the solution. For instance, referring to FIGS. 1 and 2 at T=0, for zone 1 a secondary is over tooth zero at bit 101 and this information is in address zero which defines a reference condition. For zone 2, the entry address at which the information is stored for the secondary being over tooth 22 is determined as follows:

at tooth 22, the carriage tick for the motion profile is 3224;

3224 divided by the number of addresses in each zone memory, 1319, equals 2 with a remainder of 586;

the bit pattern to propel the secondary at tooth 22 is 011;

the bit pattern 011 should be stored at address 586 in the zone 2 memory.

This determination is continued up through zone 5 as an example, and is shown in FIG. 18. The memory is represented by rectangular blocks such as memory block 1109 for zone 2. Each memory has 1319 addresses beginning at zero and ending at 1318. In zone 2, the data following address 586 is the data for the next 1318 ticks mapped onto the addresses one to one looping back from the end address to the beginning address of the memory. In this way the location for the control data in the memory for each zone can be quickly determined.

Figure 13A:
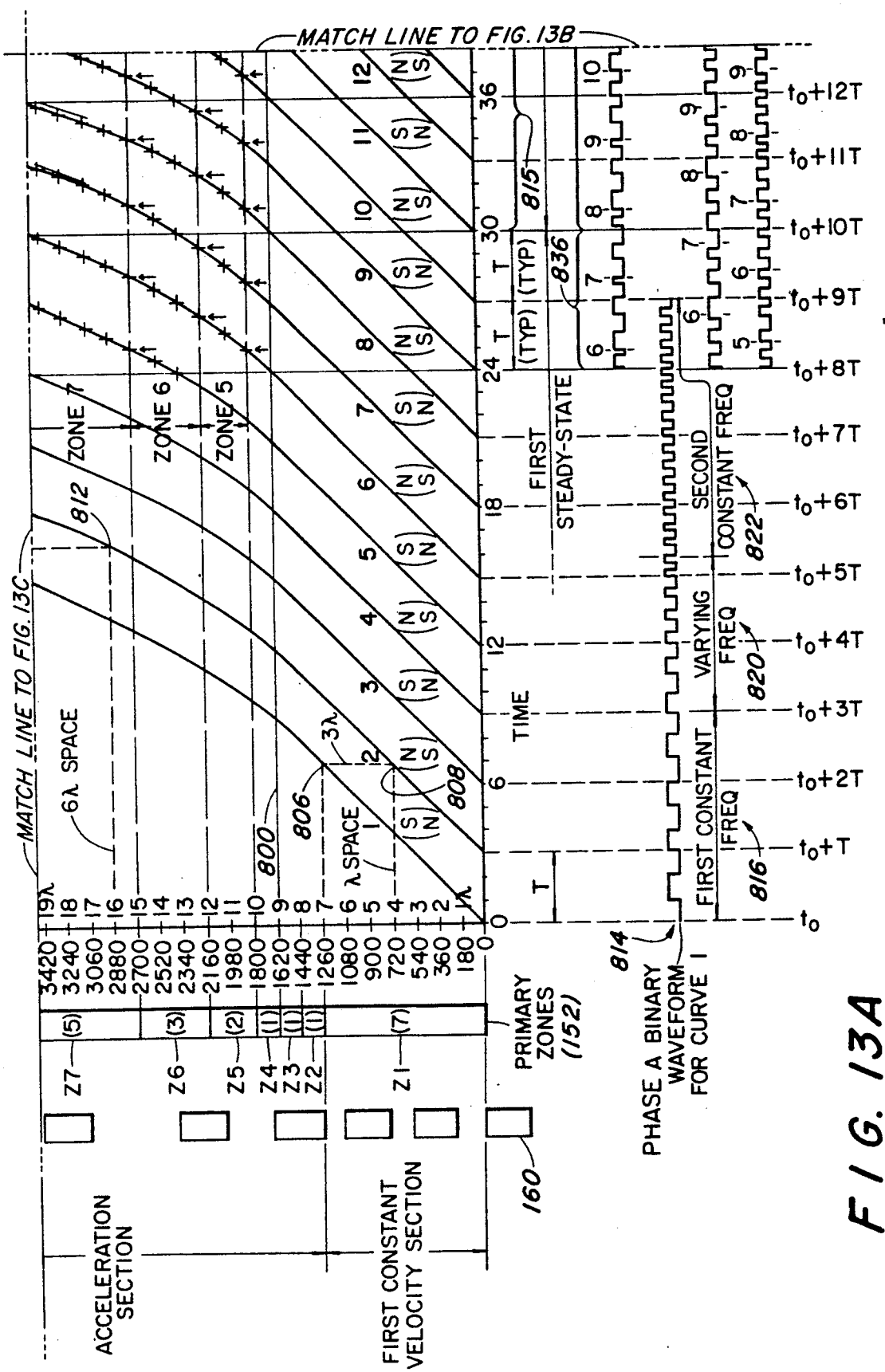
FIGS. 13 A-D are the same as FIGS. 13 A-D of the '582 patent which shows a graphical representation of the position of secondaries along the primary in phase angle versus time for two representative steady-state conditions and a representative transition state condition.
Figure 13C:
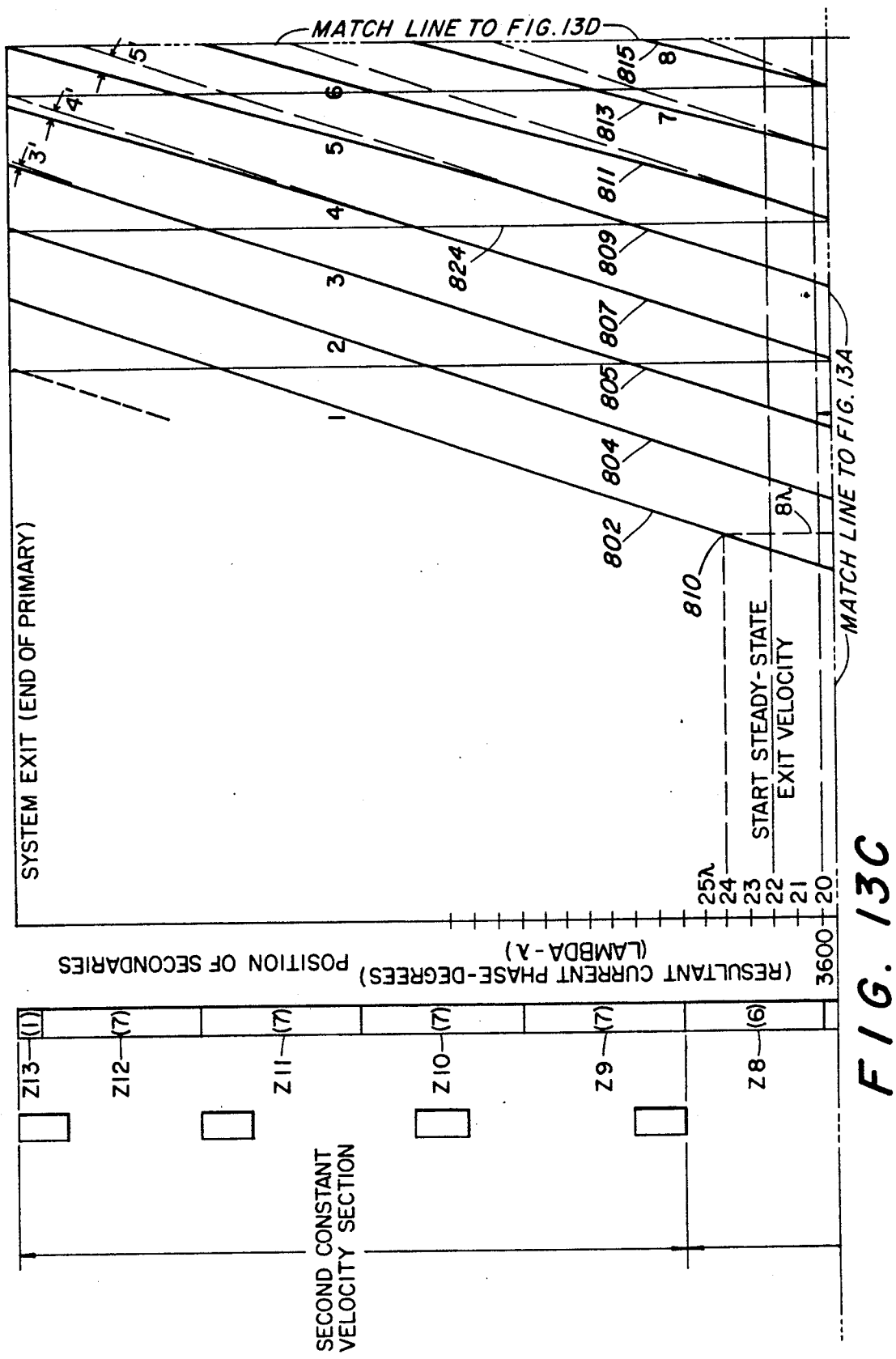

When defining the motion curve or profile, there is a problem that the position versus time data in FIG. 13 from the '582 patent is not always readily available. For instance, the machine operator does not think in terms of the time it takes for a secondary to reach a particular position. The operator thinks in terms of the spacing between secondaries at a particular position or, in other terms, the speed the secondary should reach at a particular position. The machine controls must then convert this information to the desired format of time versus position, or ticks versus teeth which can easily convert to ticks versus bit pattern for the zone controller memories.

Figure 5:
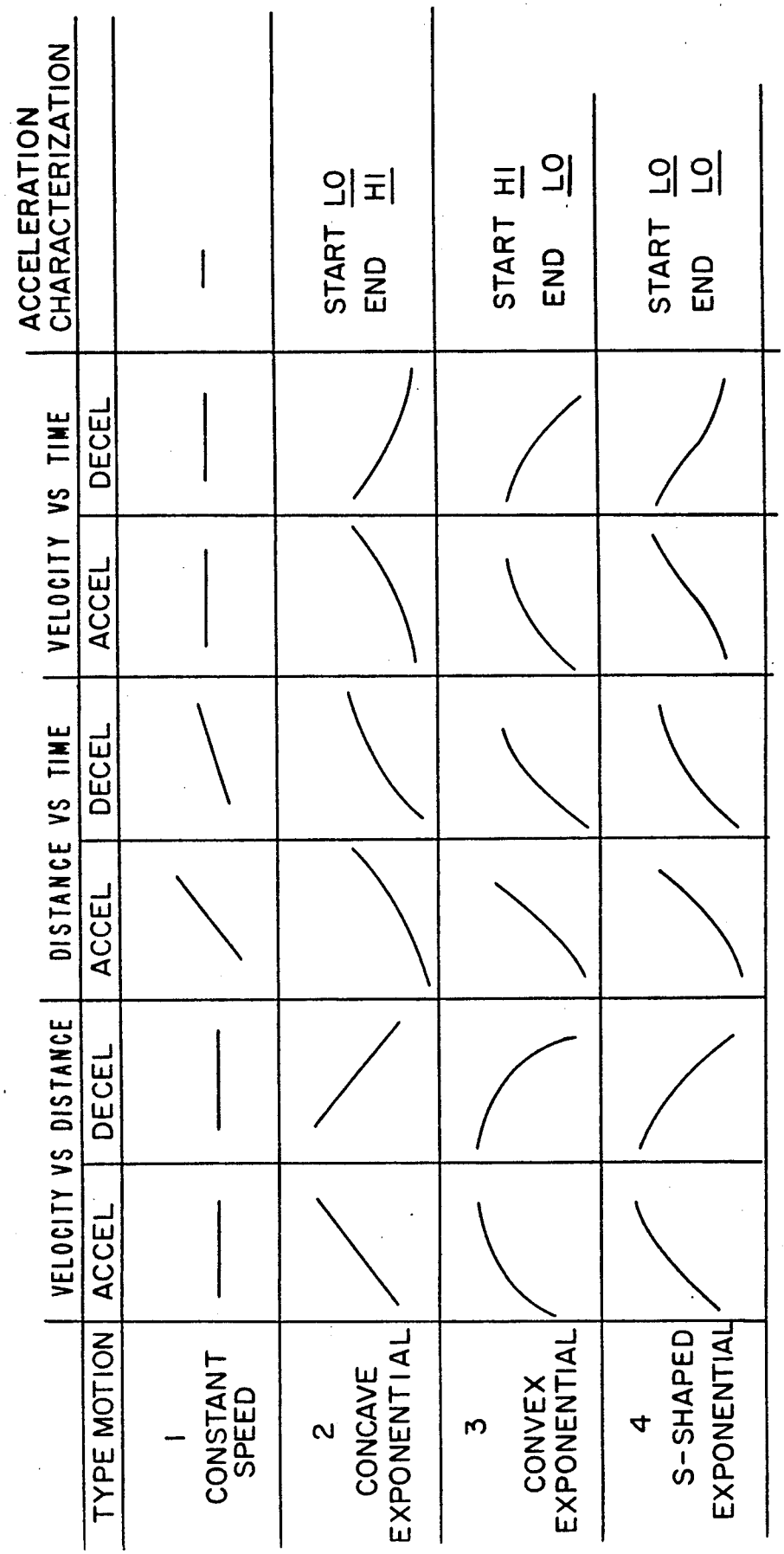
FIG. 5 is a table showing characteristic speed versus time profiles describing possible carriage motions going through the tenter.

The operator also does not know the complete array of speed versus position information. Frequently, he only has a few key data points. For instance, in one use of the linear motor system of the '582 patent, the linear motors are employed to propel film clip carriages in opposed loops for the purpose of simultaneously biaxially stretching film. Such a use is explained in detail in the referenced '910 application. The invention enables the operator to specify the motion of an active (synchronous) carriage as it proceeds along the linear motor primary distributed along the stretching section of a tenter frame. A PROFILE is a description of this motion. Typically, the operator will describe this motion in terms of a desired carriage speed (or spacing, or stretch ratio) at several positions along the stretching side of the tenter. Specifically, the control system computer allows the operator to specify a desired carriage speed (or spacing, or stretch ratio) at an arbitrary number of positions along the tenter. This divides the tenter into many segments which can be of equal or different lengths. The operator also specifies the acceleration type that is to be used to control the motion of the carriage throughout each of these segments. FIG. 5 shows eight typical types that are stored in the computer and several ways of expressing their characteristics. As a result of combining the information for each segment within the computer, an overall speed versus position profile is defined for the steady state operation. Every carriage going through the tenter will follow this profile.

Figure 14:
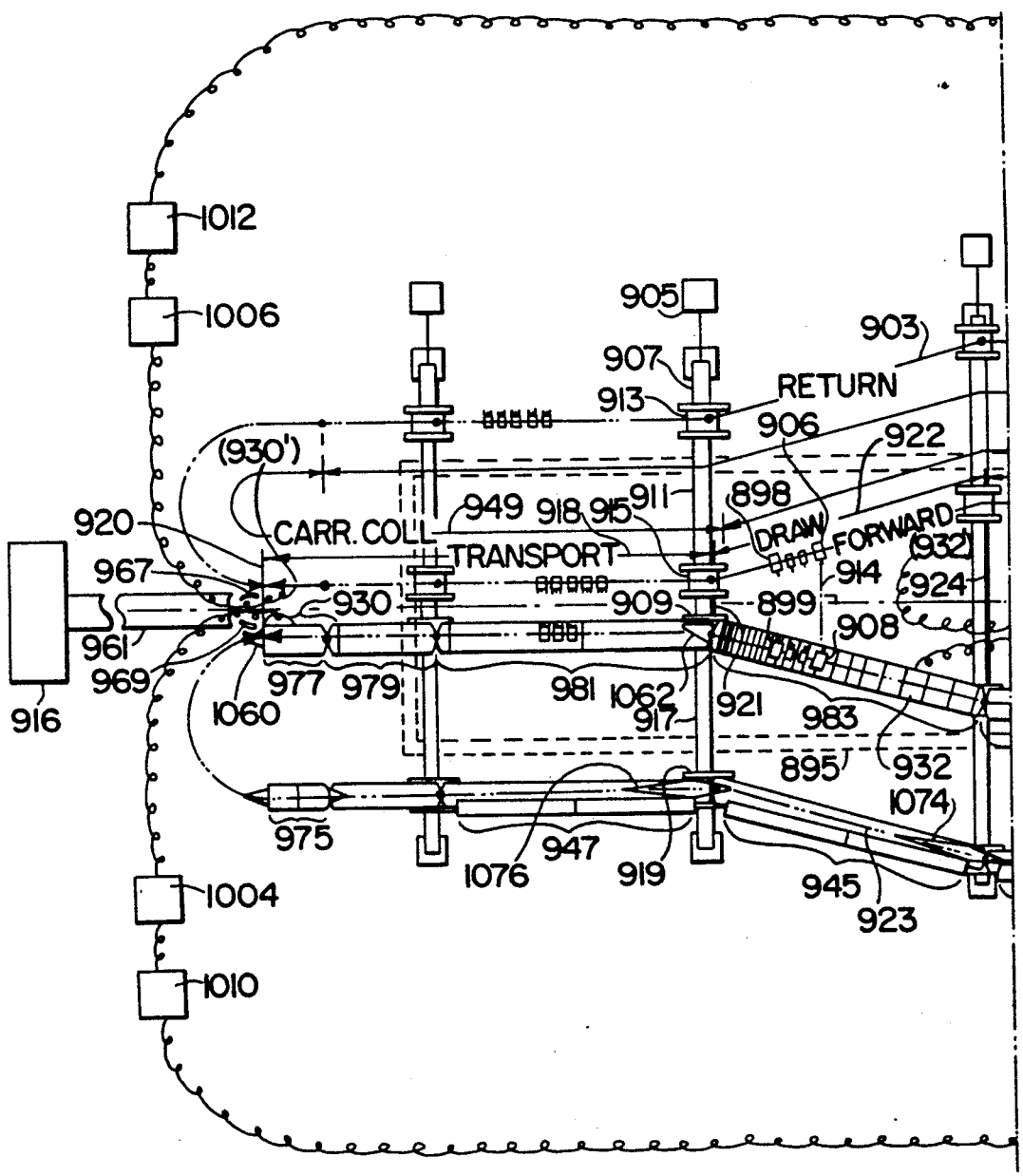
FIG. 14 is the same as FIG. 10 of the '910 application which shows a schematic top plan view of a simultaneous biaxial tenter frame.
Figure 14:
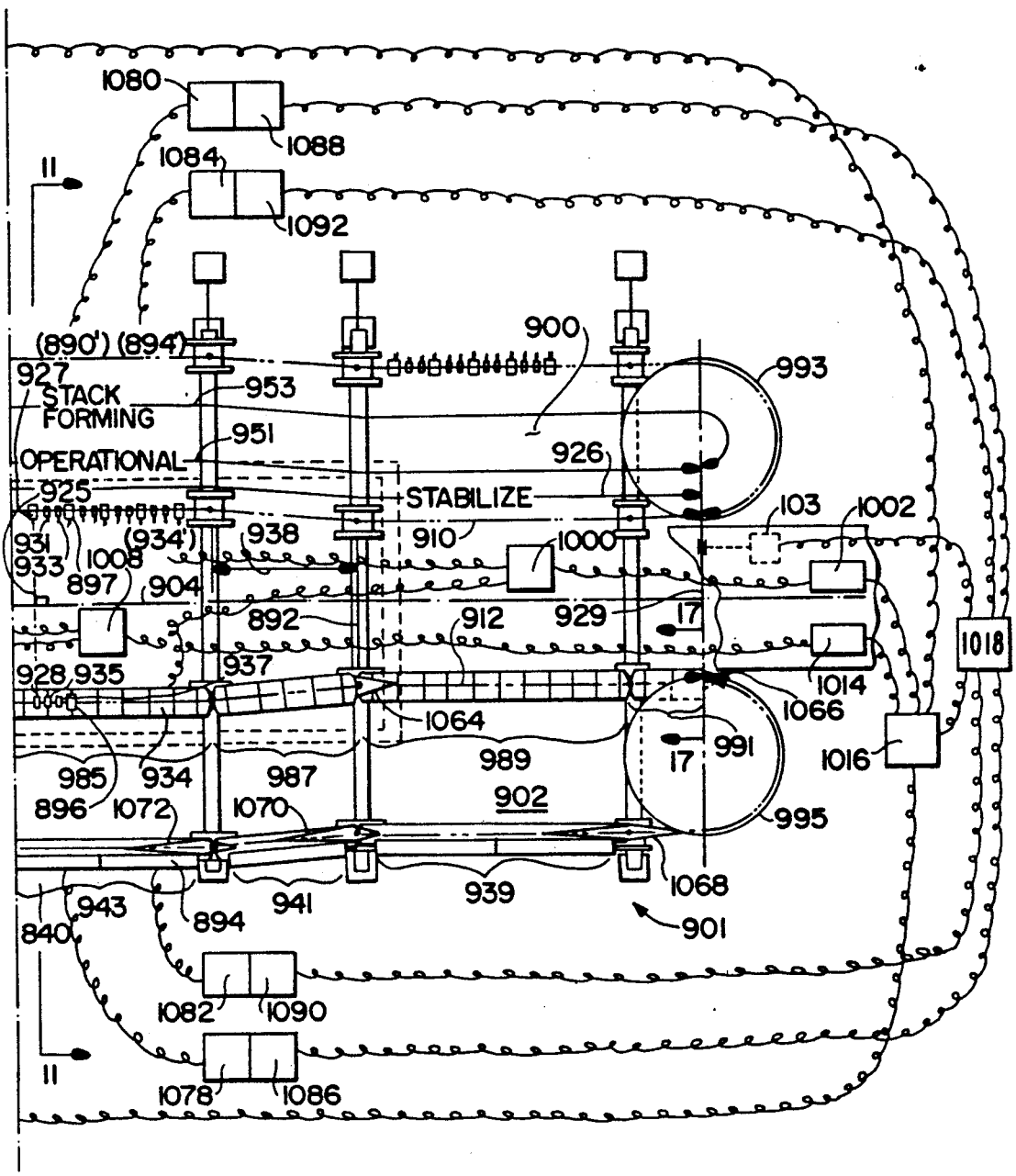
Figure 15:
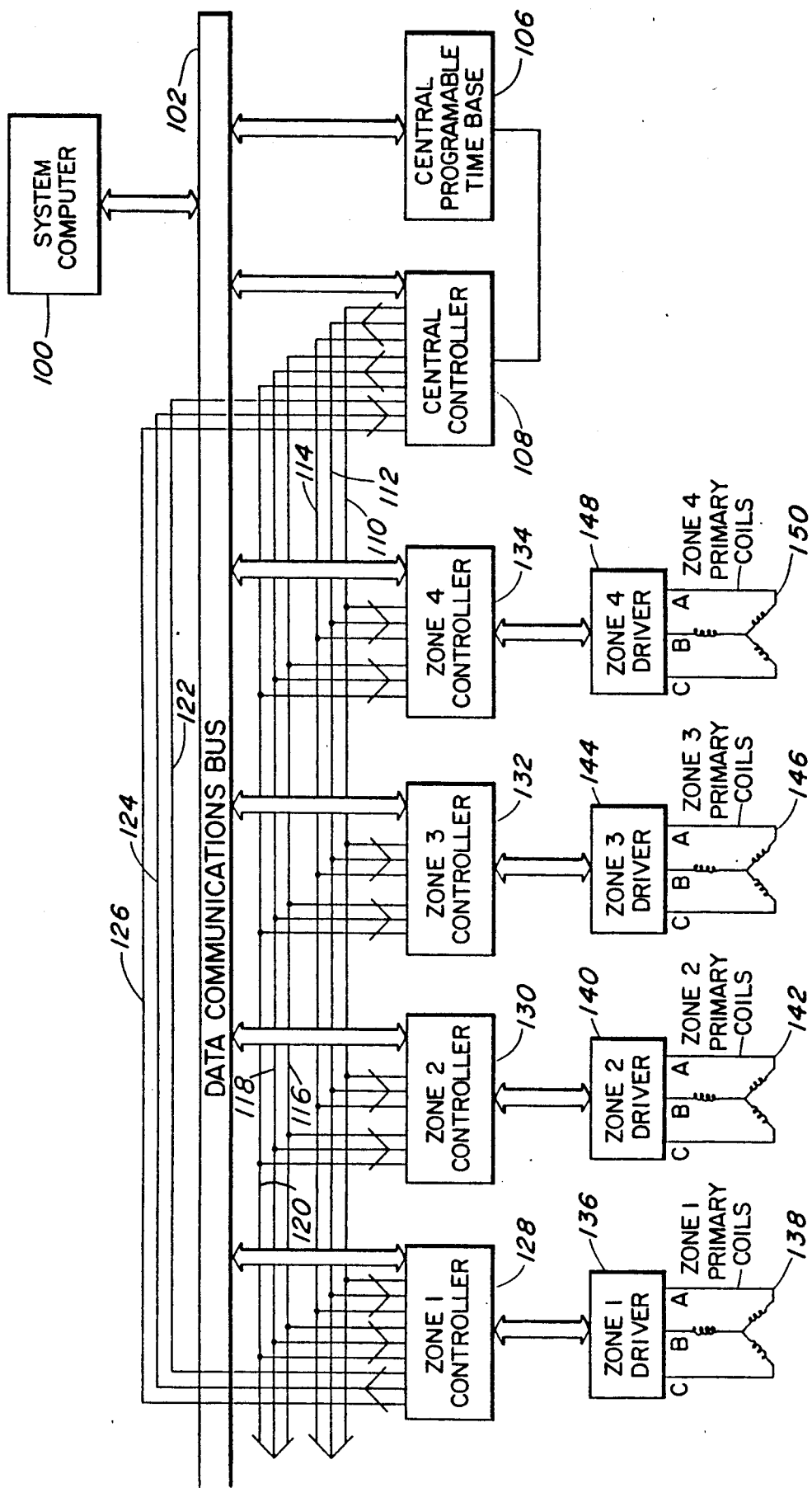
FIG. 15 is the same as FIG. 1 of the '582 patent which shows a block diagram of a representative portion of the system of the linear motor control system.

In FIG. 14 from the '910 application, the operator may, for example, know the desired speed at positions 920, 921, 914, 924, 925, 892, and 929. He also knows what he wants to happen between these positions. FIG. 3 shows a plot of desired speeds at different positions through the tenter frame and FIG. 4 shows the table of known information the operator can specify for the system of FIG. 14 from the '910 application. For instance, for the segment between positions 920 and 921, the speed of the clip carriages will remain constant (type 1 motion of FIG. 5) at 100; and between position 924 and 925, the speed of the clip carriages will remain constant at 350, and between 892 and 929, the speed will remain constant at 340. Between position 921 and 914, it is desired the speed will gradually change from 100 to 200, or rather the carriage will accelerate, and the speed will change following an "S"-shaped exponential speed versus time profile (type 4 motion of FIG. 5); between 914 and 924, the speed will change from 200 to 350 following a slow quadratic speed vs time profile (type 6 motion of FIG. 5). Between position 925 and 892 the carriages will slow from 350 to 340 following a concave exponential speed vs time profile (type 2 motion of FIG. 5). The operator may select a variety of carriage motion profiles. The profile types designated in FIG. 4 are those tabulated in FIG. 5. The verbal description refers to the speed or velocity vs time representation since it is the more common mathematical expression that gives a feel for the accelerations involved. A given carriage motion can be defined in a variety of ways shown by the different curves for each type and the same types of motion can be applied to speed up or slow down the carriages as they continuously advance through the tenter frame or some other apparatus. In defining the steady state curve, as many variety of motions and segments as desired may be used subject to machine limitations of the linear motor system and operational limitations for the process.

Figure 9:
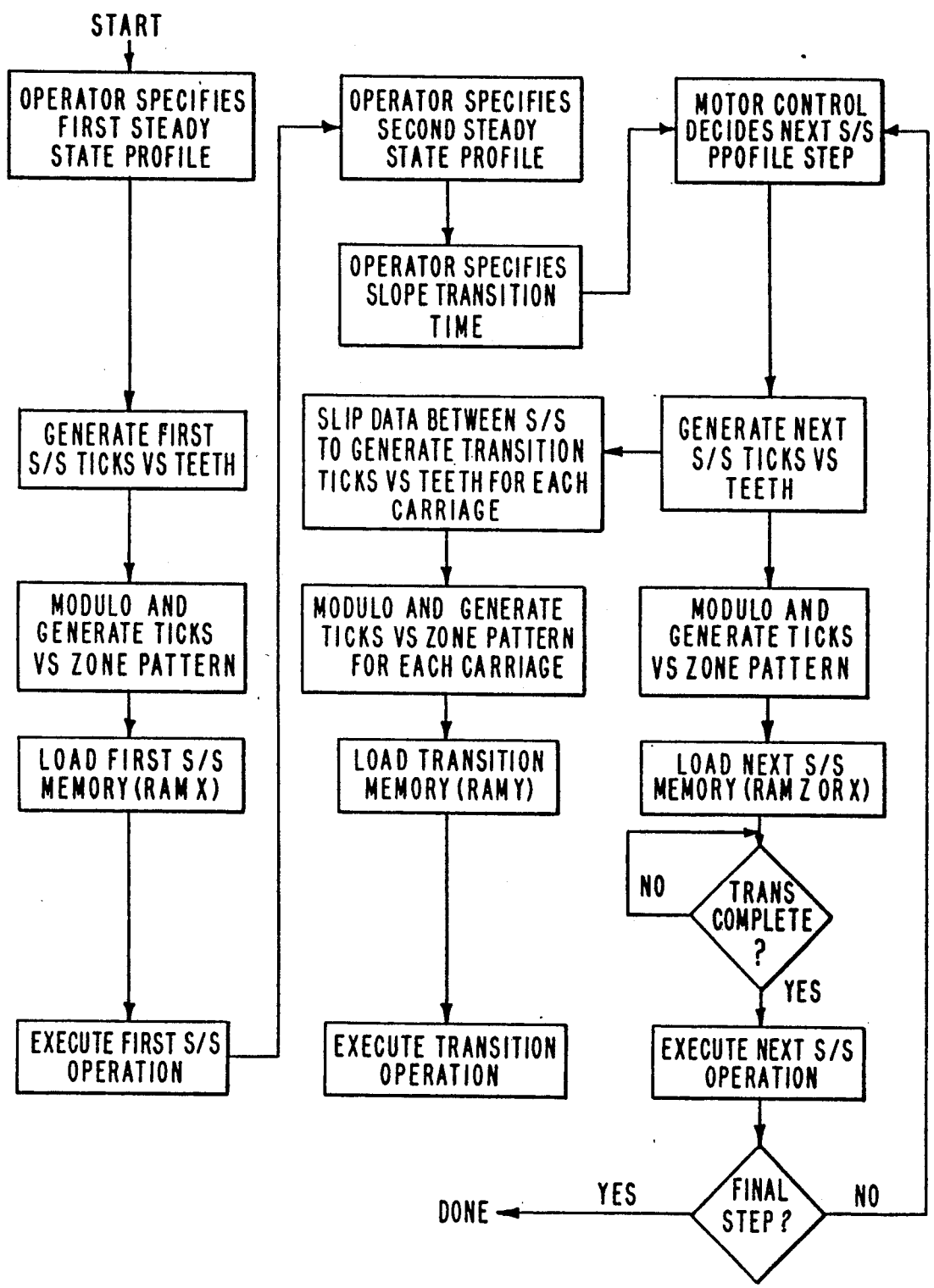
FIG. 9 is a flow diagram that generally indicates the steps involved in developing the steady state and transition control instructions in operating the linear motor system.
Figure 16:
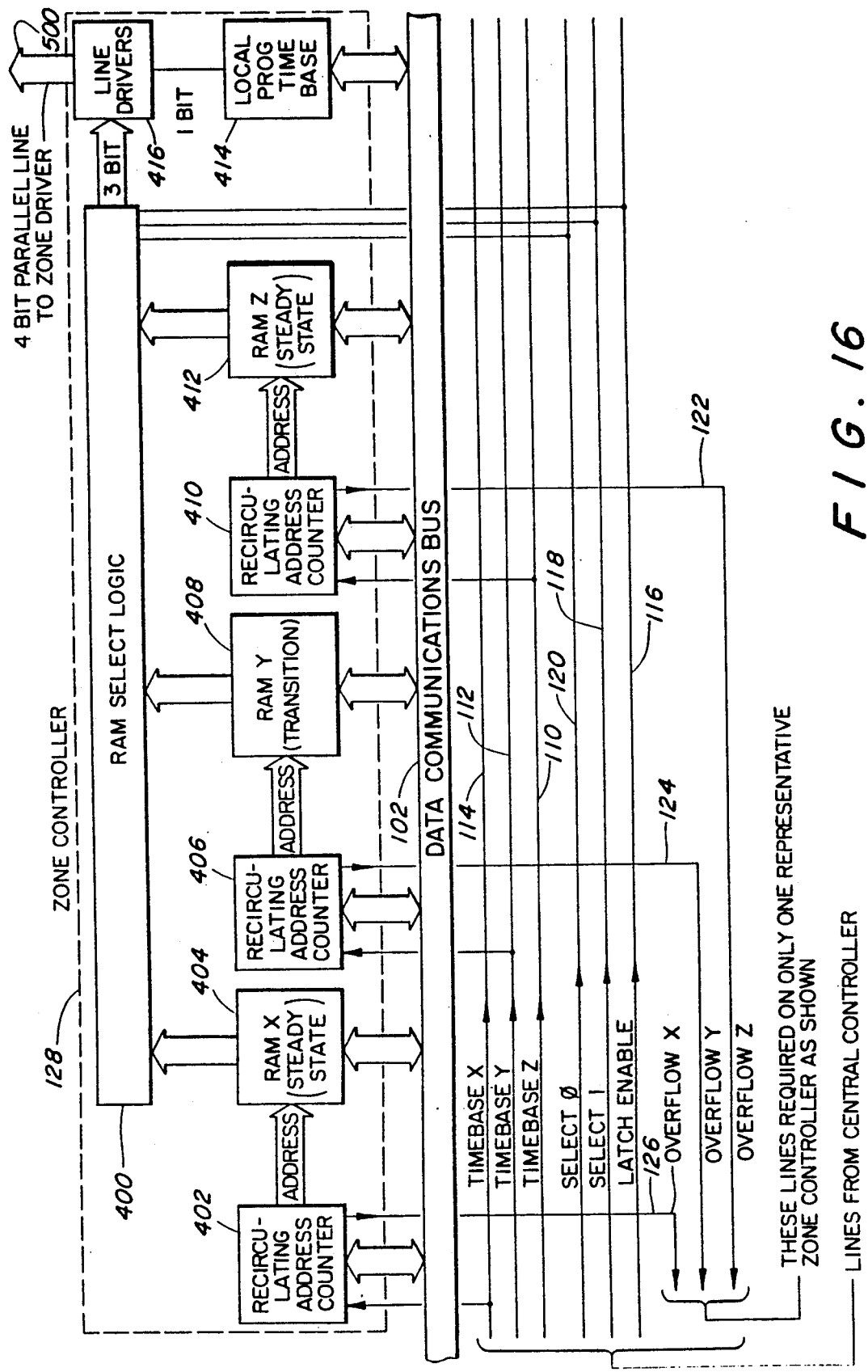
FIG. 16 is the same as FIG. 5 of the '582 patent which shows a detailed block diagram of a zone controller of the linear motor control system.

FIG. 9 shows a flow diagram for determining motion profiles for the system of the invention. Referring to the left side of the Figure, when the operator specifies the motion profile for a first steady state condition of motion for the carriages utilizing FIGS. 3, 4, and 5 as discussed above, the machine control generates a steady state table of profile data in terms of ticks vs teeth. This table is then converted by the modulo operation into the zone memory data of bit pattern vs ticks and this information is stored in the first steady state memory, RAM X, reference FIG. 16 from the '582 patent. In the '582 patent, there were two types of secondaries used, one following the other, which necessitated a 180 degree alteration of the information for adjacent secondaries. To simplify this discussion, consider only one type secondary is used so the bit patterns for adjacent secondaries are the same and the memory need only store the information for one secondary.

The invention provides a method of getting from the operator data to the bit patterns for the zone controller memories. It involves defining segments of the carriage motion profile, combining predetermined acceleration types for the segments and translating from speed versus position to ticks versus teeth and then converting from teeth to bit patterns for each tick.

TRANSITION OPERATION

The operator also may wish to change the speed versus position relationship of the carriages (secondaries) while the film tenter of the '910 application is running. The first steady state condition described by FIGS. 3 and 4 with acceleration type 2, may be changed to a second steady state condition with a different final speed and a different acceleration profile. Alternatively, the final speed may remain the same and the acceleration profile change or the acceleration profile may remain the same and only the final speed change. The operator will enter the new conditions in a new table as was described above referring to FIG. 4 and the control system will calculate the transition bit patterns to make the changes. Calculating these changes as was done for the curves shown in FIG. 13 from the '582 patent requires significant effort to define the different continuous, analog equations of motion for each of numerous transition carriages and it requires significant computer time (minutes to hours depending on the complexity of the profile) to calculate the data. It has been discovered that the effort and time can be considerably reduced (5-10 seconds, independent of the complexity of the profile) by using the two tables of discrete steady state data and making discrete approximations for the many tables of transition data for the carriages going from one steady state to the other. This is in contrast to the complex, continuous, analog calculations to develop the transition data for FIG. 13 from the '582 patent. In the case of the tenter, the product made during the changes in steady state is not useable and must be scrapped, so the exact nature of the motion of the carriages moving between the steady states can be defined in several ways, and minor differences between continuously defined data and discretely defined data is not important.

The transition profile $R_T(p,c)$ is a discrete function defining the time, after entering the tenter, that it takes a carriage to reach a certain position, i.e., phase, p, along the linear motor primary. That is, this function is only meaningful at integer values of the phase, p, and of the carriage number, c. Furthermore, the current and new profiles, $R_C(p)$ and $R_N(p)$, are also discrete in nature, each only being meaningful at integer values of phase, but independent of carriage since every carriage follows the same profile.

Numerical methods have been developed to take advantage of this inherent discrete nature of the linear motor control system of the '582 patent. These methods start with the discretized current and new profile functions (arrays) instead of the original analog profile definitions. The discretized transition profile function (matrix of integer values) is then calculated directly from these two arrays.

One great advantage of these methods is that they are based solely upon the discretized current and new profiles. Once these discretized profile functions are calculated, all further calculations are totally independent of the complexity of the original analog profile definitions.

Figure 11:
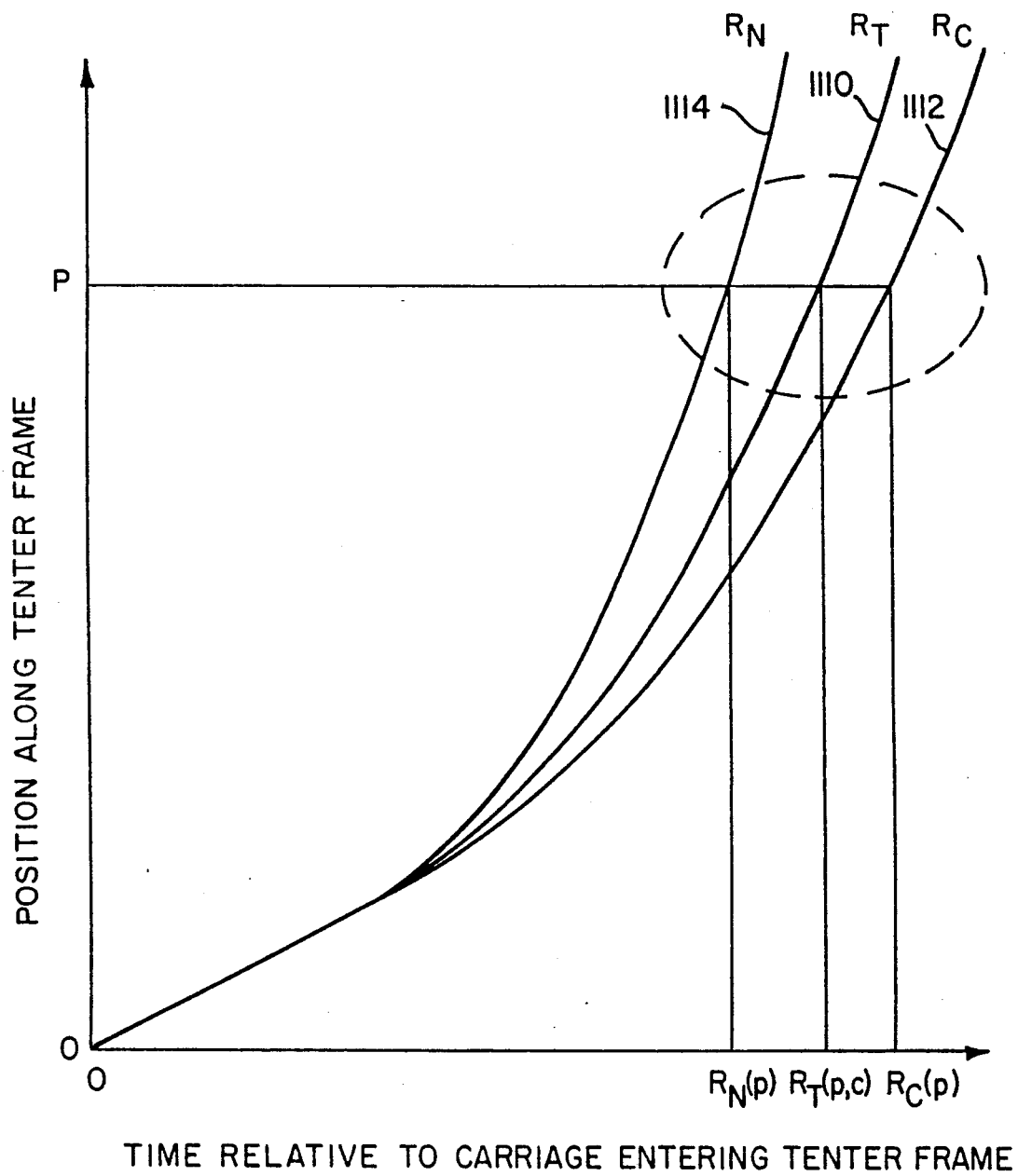
FIG. 11 is a general plot showing a typical transition profile in terms of phase along the tenter versus time relative to the carriage entering the tenter.

One group of these discrete methods (called the profile slip methods) are characterized by requiring that every carriage follow a profile somewhere between the current and the new profiles, during the transition process. This is illustrated in FIG. 11. Every transition profile such as 1110 will always be in between the current profile 1112 and the new profile 1114.

The profile that a carriage will follow during the profile change process can be represented by the transition profile defined as a linear combination of the current profile and the new profile.

The transition profiles may be a family of any valid profiles that uniquely describe the motion of the carriages through the system. Examples of different transition profile types include the inverse position profile, the inverse speed profile, and the actual speed profile. These different profile types involve different methods of "slipping" the discrete data for the transition profiles from the current (pre-transition) to the new (post-transition) profile. Three different profile slip methods will be briefly described. Other methods (based upon some other profile that has not been defined herein) do exist but will not be discussed. To help illustrate the differences between these methods, the portion within the oval in FIG. 11 has been enlarged and shown in FIG. 12.

Figure 12:
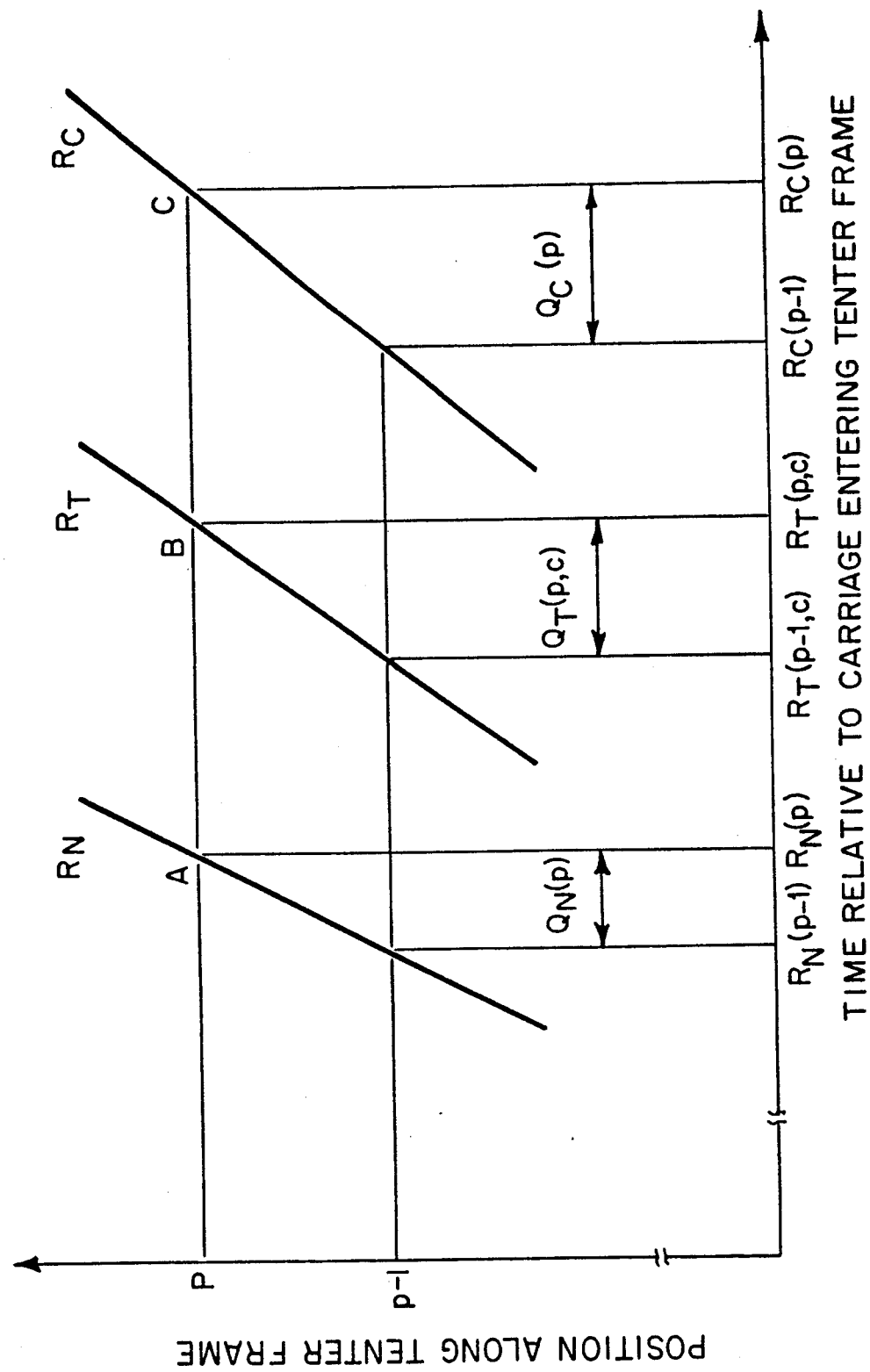
FIG. 12 is an enlarged view of part of the plot of FIG. 11.

The method of inverse position slip (MIPS) produces a profile characterized by requiring that every carriage follow an inverse position (that is, a time versus position) profile somewhere between the current and the new inverse position profiles, during the transition process. Specifically the motion that a carriage will follow during the profile change process is represented by the inverse position transition profile, $R_T(p,c)$, and is defined as a linear combination of the current inverse position profile, $R_C(p)$, and the new inverse position profile, $R_N(p)$; that is, $$r_T(p,c) = F(\ldots)*R_N(p) + [1 - F(\ldots)]*R_C(p)$$

where $F(\ldots)$ is the weighting function that determines how the slip from the current to the new profile will be accomplished. By rewriting, $$[R_C(p) - R_T(p)] = F(\ldots)*[R_C(p) - R_N(p)]$$

and referring to FIG. 12, it is seen that:

$$|BC| = F(\ldots)*|AC|$$

where $|BC|$ is the length of the line from B to C.

The method of inverse speed slip (MISS) produces a profile characterized by requiring that every carriage follow an inverse speed (versus position) profile somewhere between the current and the new inverse speed profiles, during the transition process. Specifically the motion that a carriage will follow during the profile change process is represented by the inverse speed profile, $Q_T(p,c)$, and is defined as a linear combination of the current inverse speed profile, $Q_C(p)$, and the new inverse speed profile $Q_N(p)$; that is, $$Z_T(p,c) = F(\ldots)*Q_N(p) + [1 - F(\ldots)]*Q_C(p).$$

The resulting transition profile for this method is:

$$R_T(p,c) = R_T(p-1,c) + Q_C(p) - F(\ldots)*[Q_C(p) - Q_N(p)].$$

The method of actual speed slip (MASS) produces a profile characterized by requiring that every carriage follow a speed (versus position) profile somewhere between the current and the new speed (versus position) profiles, during the transition process. Specifically the motion that a carriage will follow during the profile change process is represented by the actual speed profile $S_T(p,c)$, and is defined as a linear combination of the current actual speed profile, $S_C(p)$, and the new actual speed profile, $S_N(p)$; that is:

$$S_T(p,c) = F(\ldots)*S_N(p) + [1 - F(\ldots)]*S_C(p).$$

By noting that $S.(\ldots)$ is the reciprocal of $Q.(\ldots)$, this expression may be rewritten as:

$$S_T(p,c) = \{F(\ldots)*Q_N(p)^{-1} + [1 - F(\ldots)]*Q_C(p)^{-1}\}^{-1}.$$

The resulting transition profile for this method is:

$$R_T(p,c) = R_T(p-1,c) + \{S_C(p) - F(\ldots)*[S_C(p) - S_N(p)]\}^{-1}.$$

The weighting function, $F(\ldots)$, determines how the slip from the current to the new profile will be accomplished. This function must be selected so that it satisfies all the requirements and physical constraints associated with the system. There is a whole family of such weighting functions that will satisfy all these constraints.

If the weighting function always has a value between zero and one, then the resulting transition profile will always be between the current and new profiles. Before the transition starts, the current profile will be active, therefore the weighting function must be zero. Similarly, after the transition is over, the new profile will be active, therefore the weighting function must equal one. Furthermore, it is reasonable to require that the weighting function be continuous and non-decreasing for increasing time over the entire period of the transition, ST. In many cases these conditions are sufficient to ensure that all of the physical constraints will be totally satisfied.

Two possible weighting functions will now be briefly described.

The "linear in time" weighting function may be selected as a linear function of only the time (LT); that is, $$F(p,t,c) = \begin{cases} 0, & \text{for } t \leq 0 \\ t/ST, & \text{for } 0 < t < ST \\ 1, & \text{for } ST \leq t \end{cases}$$

This LT weighting function meets all of the system constraints. Note that the time, t, in this expression may be equated to the time from the start of the transition until the time the carriage enters either the previous phase (p−1), or the new phase p; that is:

$$t = R_X(p-1,c) \text{ or } R_X(p,c).$$

The choice would depend upon the chosen transition profile type and its numerical characteristics.

The "linear in carriage" weighting function may alternatively be selected as a linear function of only the transition carriage number (LC); that is, $$F(p,t,c) = \begin{cases} 0, & \text{for } t \leq 0, \text{ or } c \leq 0 \\ c/C_x, & \text{for } 0 < t < ST \\ 1, & \text{for } ST \leq t, \text{ or } C_x \leq c \end{cases}$$

This LC weighting function also meets all of the system constraints. Note that c in this expression is the ordinal number of a powered carriage during transition, c=0 for the first carriage affected by transition, and $C_X$ is the Xth carriage affected.

Three transition profile types and methods, and two weighting functions have been described. These are summarized on the following table. Other slip criteria and weighting functions exist.

| PROFILE SLIP METHOD POSSIBLE COMBINATIONS | | |
|---|---|---|
| | WEIGHTING FUNCTION | |
| TRANSITION PROFILE TYPE | Linear in Time (LT) | Linear in Carriage (LC) |
| Inverse Position Slip (MIPS) | A | B |
| Inverse Speed Slip (MISS) | C | D |
| Actual Speed Slip (MASS) | E | F |

The implementation of a specific profile slip method consists of selecting a transition profile type and a weighting function. The table "Profile Slip Methods—Possible Combinations" illustrates this point. The transition profile types define the rows and the weighting functions define the columns of the matrix. Any cell within the matrix is a valid combination. Profile Slip Method C has been found to work very well and will satisfy all the physical constraints under all possible operating conditions.

Also from actual experience with a linear motor tenter control system, running on an HP-1000 minicomputer, using worse case values, the calculations for one profile change using Profile Slip Method C takes less than ten seconds to complete. This time is independent of the complexity of the profiles. This is fast enough so that the profiles may be specified in real time, and that the calculations may be done in real time.

To contrast this with the analog methods; for the simplest of current and new profiles, the analog methods will run at least several hundred times longer on a computer than the profile slip methods. This will increase to a thousand and more times longer as the complexity of the profiles increase.

It is not practical, therefore for these calculations to be done in real time. The data must be precalculated and stored on disk. This approach, however, requires a large amount of disk storage; as much as one billion bits of data for a single sequence of steps. In addition, loading the data for a specific step from the disk into the computer could take several minutes. Furthermore, this approach does not lend itself to last minute changes in the operating conditions.

A preferred method used to arrive at the tables of discrete transition data is described in more detail by the following:

1. Decide at what whole integral of T the transition is to begin. For instance referring to FIG. 13 ('582), the transition begins at 10T shown by line 824.

2. Decide the magnitude and character of the second steady state curve (the first steady state has already been defined and is currently running). For instance referring to FIG. 13 ('582), in the first steady state the carriages are undergoing a 3× speed change. Operating at the second steady state, the carriages will undergo a 4× speed change. The character of the speed change of the second steady state curve remains the same as the first, a concave exponential speed-time relationship (type 2, FIG. 5).

3. Decide over what time interval the slope of the curves will be transitioning from the slope of the first steady state to the slope of the second steady state. For instance referring again to FIG. 13 ('582), the slope transition interval is shown at 815 between lines 824 and 832. This interval will be referred to as ST. This value may be as low as zero, but as a rule of thumb, a value of at least 1T is recommended to eliminate high accelerations when transitioning. In a tenter where film stretching is changing during transition, the ability of the film to undergo rapid stretching changes without tearing must be taken into consideration. Usually a large value of ST time is chosen (>>50T) provided it doesn't exceed the capacity of the memory hardware and time constraints. For the system of FIG. 13 ('582), a value of ST of 3.33T was chosen (this illustrates a general abbreviated case. For convenience, ST is usually specified to when the first carriage following the new steady state curve enters the portion of the system where the carriages are spaced apart, i.e. ST becomes a whole multiple of T.)

4. Calculate the total time for the complete transition to occur, which will be called TR. TR will be some whole integral of T, greater than or equal to ST, and generally consists of the slope transition time plus a clear out time for the carriages that entered during slope transition to leave the system. The minimum clear out time can be some time greater than the time for the last secondary affected by transition to leave the system. In FIG. 13 ('582), carriage 11 is the last carriage to enter the spaced apart portion after transition begins. Looking at the time carriage 11 leaves the system at the top of the figure (based on the calculated data from step 3), the time is just less than 8T after slope transition began, so the total transition time should be 8T, which is shown as the distance between lines 824 and 834. If ST were equal to zero, carriage 8 would be the last carriage affected and TR could equal 5T in this simplified case with only one type secondary ("A" type). Greater than the minimum value for TR can be used, but it would only serve to consume transition memory, since the slope changes have already been accomplished, and all information in memories is now being repeated in time.

5. Develop transition data for all carriages undergoing slope transition, curves 2-11, by incrementing the data for each tooth by a relationship that meets the constraints below:
   a. the distance between any two carriages after the final constant speed is reached should not change significantly before, during, and after transition. This is very important when the system is used to transport already stretched film at this speed since in this part of the tenter the film is not heated sufficiently for stretching. It is important in any system that carriages do not catch up and collide with adjacent carriages.
   b. there should never be more than one carriage in a zone after the carriages have been spaced apart.

6. The constraints of 5 can best be met over a broad range of conditions by the following MISS relationship:

$$X_p = X_{p-1} + [I_o - (I_o - I_n)(X_{p-1}/ST)]$$

for $0 \leq X_{p-1} \leq ST$ where, within this equation:

$X_p$—an abbreviation of $R_X(p)$ that defines the time in ticks for a particular carriage, X, to reach a particular position or phase or tooth, p.

$X_{p-1}$—an abbreviation of $R_X(p-1)$ that defines the time in ticks for carriage X to reach the preceding tooth (already known from the current (pre-transition) profile or the previous calculation).
   = $t_{p-1} - t_T$ where $t_{p-1}$ is the total time for the secondary of interest to reach the preceding tooth and $t_T$ is the time from when the secondary entered the system til transition begins.

$I_o$—for the old, current pre-transition profile, the time Increment in ticks for the carriage to travel between tooth p and the preceding tooth p−1.
   = $t_{o,p} - t_{o,p-1}$ where $t_{o,p}$ is the time at the old steady state for the secondary to reach the tooth of interest and $t_{o,p-1}$ is the time to the preceding tooth.

$I_n$—for the new, post-transition profile, the time Increment in ticks for the carriage to travel between tooth p and the preceding tooth p−1.
   = $t_{n,p} - t_{n,p-1}$ where $t_{n,p}$ is the time at the new steady state for the secondary of interest to reach the tooth of interest and $t_{n,p-1}$ is the time to the preceding tooth.

ST—designated slope transition time, which for convenience is usually the time from start of transition till first carriage enters spaced apart section following the new curve.

($_{p-1}$/ST)—the linear-in-time weighting function which is the fraction of time for the carriage to reach the preceding tooth compared to the total slope transition time.

Other relationships can be used, but this one produces excellent results under all practical operating conditions and is simple and quick to carry out.

Figure 10:
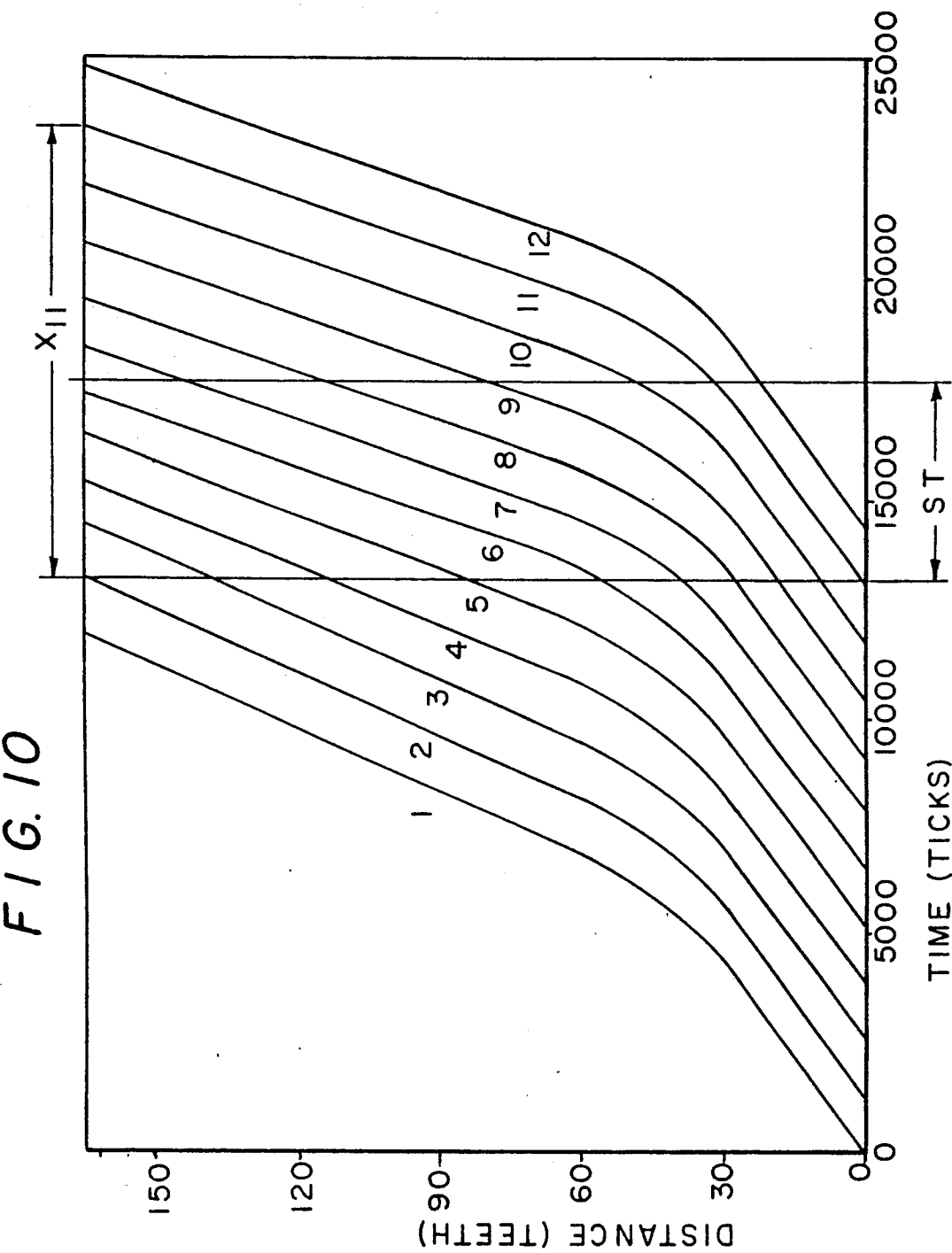
FIG. 10 is a plot of the data in FIG. 8 showing the steady state and transition profiles produced by the method of the invention for comparison to FIG. 13 of the '582 patent.

To better understand the above steps, a specific example using the conditions of FIG. 13 from the '582 patent is developed using FIG. 8. FIGS. 8A, 8B, and 8C show the tables of values determined by the method of the invention for all carriages undergoing slope transition and the carriages at the beginning and end traveling at the first and second steady states. The data is shown as the ticks to each tooth for each carriage assuming all carriages are starting at the same time. In this way relative differences in the data can readily be seen. When the data, using a separation time, T, of 1319 ticks, are plotted, the curves of the invention will resemble the curves of FIG. 13 ('582) that were determined by continuous analog methods known in the art. This plot for the data in FIG. 8, produced by the method of the invention using the basic conditions of FIG. 13 ('582), is shown in FIG. 10.

The relationship of paragraph 6 can be best understood by referring to FIG. 7 which shows how the invention would be applied to calculate the data for carriage 7 at tooth 60. The process is the Method of Inverse Speed Slip, or MISS with a profile slip method C of the combination table above that utilizes a linear in time weighting function.

In general, the procedure is to calculate successive time data values (ticks) for each tooth in the system for each carriage based on the known information for the old and new steady states and the chosen slope transition interval, ST. The data for the next tooth for a particular carriage is a function of:

the time, $X_{p-1}$, when the carriage entered the previous tooth relative to when transition started plus an increment of time differing from the slope of the old curve determined by;

the slope of the old curve for the carriage at the preceding tooth in terms of the ticks increment between teeth, $I_n$;

the slope of the new curve for the carriage at the preceding tooth in terms of the ticks increment between teeth, $I_n$;

the fraction of the time, $X_{p-1}$, to the previous tooth relative to the total slope transition time, ST.

In the case where it is desired to find values for $X_p$ preceding the start of slope transition, ST, these values are already known and are the same at those teeth as the old first steady state values, i.e. $X_p$ equals $X_{p-1}$ plus $I_o$. When it is desired to find values for $X_p$ following the end of slope transition, ST, $X_p$ equals $X_{p-1}$ plus the slope of the new second steady state curve, $I_n$.

As an example of how the data for FIG. 8A is developed, consider carriage 7 (column 7) and solve for the information for teeth 56, 57, 58, 59, and 60 (rows 56,57,58,59,60). Carriage 7:

$Xp = Xp - 1 + [Io - (Io - In)(Xp - 1/ST)]$
where the terms on the right are the following:

$Xp - 1 = X_{55} = t_{55} - 4(t)$
$= t_{55} - 4(1319)$ $X_{55} = 6468.5 - 5276 = 1192.5$ $Io_{56} = to_{56} - to_{55} = 6560.9 - 6501.4 = 59.5$
$In_{56} = tn_{56} - tn_{55} = 6191.3 - 6145.4 = 45.9$
$ST = 3.33(T) = 4392.3$ $X_{56} = 1192.5 + [59.5 - (59.5 - 45.9)(1192.5/4392.5)] =$
$X_{56} = 1248.3$
$t_{56} = X_{56} + 4(T) = 1248.3 + 5276$
$t_{56} = 6524.3$ (see row 56, column 7)

$X_{57} = 1248.3 + [58.3 - (58.3 - 44.8)(1248.3/4392.3)]$
$X_{57} = 1302.9$ $t_{57} = 1302.9 + 5276$
$t_{57} = 6578.9$ (see row 57, column 7)

$X_{58} = 1302.9 + [57.2 - (57.2 - 43.8)(1302.9/4392.3)]$
$X_{58} = 1356.1$
$t_{58} = 1356.1 + 5276$
$t_{58} = 6632.1$ (see row 58, column 7)

$X_{59} = 1356.1 + [56.0 - (56.0 - 42.8)(1356.1/4392.3)]$
$X_{59} = 1408.0$
$t_{59} = 1408.0 + 5276$
$t_{59} = 6684.0$ (see row 59, column 7)

$X_{60} = 1408.0 + [55.0 - (55.0 - 41.9)(1408.0/4392.3)]$
$X_{60} = 1458.8$
$t_{60} = 1458.8 + 5276$
$t_{60} = 6734.8$ (see row 60, column 7)

For a given tooth, say tooth 60, the data across for each carriage, referring again to FIG. 8A, is figured as follows:

Referring to the plots of FIG. 13, carriages 2, 3, 4, and 5 reach tooth 60 before transition begins, therefore, their value of $t_{60}$ is equal to the value of the first steady state for $t_{60}$, or $t_{60} = 6787.4$ ticks. Carriage 6 reaches tooth 60 after transition, so for carriage 6:

C6:
$X_{60} = X_{59} + [Io - (Io - In)(X_{59}/ST)]$
$X_{59} = 6732.1 - 5(1319) = 6732.1 - 6595$
$X_{59} = 137.1$
$X_{60} = 137.1 + [55.0 - (55.0 - 41.9)(137.1/4392.3)]$
$X_{60} = 191.7$
$t_{60} = 191.7 + 6595$
$t_{60} = 6787.7$ (see row 60, column 6)

C7:
$t_{60} = 6734.8$ from previous calculations (see row 60, column 7)

C8:
$X_{59} = 6579.3 - 3(1319) = 6579.3 - 3957 = 2622.3$
$X_{60} = 2622.3 + [55.0 - (55.0 - 41.9)(2622.3/4392.3)]$
$X_{60} = 2669.5$
$t_{60} = 2669.5 + 3957$
$t_{60} = 6626.5$ (see row 60, column 8)

C9:
$X_{59} = 6461.8 - 2(1319) = 6461.8 - 2638 = 3823.8$
$X_{60} = 3823.8 + [55.0 - (55.0 - 41.9)(3823.8/4392.3)]$
$X_{60} = 3876.4$
$t_{60} = 3876.4 + 2638$
$t_{60} = 6505.4$ (see row 60, column 9)

C10:
$X_{59} = 6356.7 - 1(1319) = 5037.7$
Note: Since carriage 10 reaches tooth 59 after slope transition is complete, $ST = 4392.3$, $X_{60}$ for carriage 10 is on the same slope as the second; new steady state (although displaced in time from the new steady state), therefore:

$X_{60} = X_{59} + In$
$= 5037.7 + 41.9$ $X_{60} = 5079.6$
$t_{60} = 5079.6 + 1319$ $t_{60} = 6398.6$ (see row 60, column 10)

C11:
$X_{59} = 6323.5 - 0 = 6323.5$ $$X_{60} = X_{59} + In$$
$$= 6323.5 + 41.9$$

$X_{60} = 6365.4$
$t_{60} = 6365.4 + 0$
$t_{60} = 6365.4$ (see row 60, column 11)

It can be shown that the solutions for the data points produce values that satisfy paragraph 5, condition b, that is, the distance between any two carriages, after the second constant speed is reached, must not change significantly before, during and after slope transition. The second constant speed is reached at tooth 66, so looking at tooth 67 and tooth 165, the stability of spacing between the carriages at these separate locations can be checked as follows: at tooth 67, the space between carriages 1 and 2 is determined as follows:

on tooth 67, for carriage 2, the time is 7145.5
carriage 1 is 1319 ticks ahead of 2 or 7145.5 + 1319 = 8464.5;
at tick 8464.5, carriage 1 is at tooth 94
94 − 67 = 27 tooth spacing between carriages 1 and 2

These conditions for tooth 67 are the same for carriages 2–5, and carriages 6 and 7 have not been affected much by transition so their separation is also 27 teeth. Carriage 8, however, is affected significantly by transition so the distance between carriages 7 and 8 is affected.

tooth 67, carriage 7–8 spacing
on tooth 67 for carriage 8, the time is 6928.6
carriage 7 is 1319 ticks ahead of 8 or 6928.6 + 1319 = 8247.6
at tick 8247.6 carriage 7 is about at tooth 95
95 − 67 = 28 tooth spacing between 7–8

Similar logic applied to the other carriages at tooth 67 and to the carriages at the end of the second speed section at tooth 165 produce the table of results in FIG. 6. As can be seen in FIG. 6, the spacing (to the nearest tooth) remains the same between adjacent carriages after the second constant speed is reached (i.e. at tooth 67, the 9–10 spacing is 33 teeth and at tooth 165, the 9–10 spacing is still 33 teeth). Note that the spacing between adjacent carriages is different during transition (i.e. at tooth 67, the 7–8 spacing is 28 teeth and the 8–9 spacing is 30 teeth), however, since that is the purpose of the transition, to go from one spacing, 27 teeth, to another spacing, 36 teeth. Since the original spacing is 9 teeth, the speed/spacing ratio has changed from 3× to 4× as desired.

The data calculated and shown in FIG. 8 is in terms of ticks versus teeth. This must be converted to ticks versus bit patterns, as discussed previously, so it can be loaded into the steady state and transition memories in the zone controllers. The process of figuring out the data for each zone is determined by the modulo operation as was explained above. Each zone where the carriages (linear motor secondaries) can be spaced apart, such as zones 2–13, has 1319 ticks of binary information. This is graphically shown in FIG. 2 by the bracketed information labeled Z2, Z3, etc. in the ticks column 1102. Once a secondary has left a zone, which it usually does in less than 1319 ticks, the data for the zone may take several forms since the secondary is no longer there. For instance, the data can continue as if the secondary were still there; the data may be a constant value; or the data can be turned off (equal zero). Throughout this discussion, the first option was selected. Also, the exact tooth the data starts on may be varied within limits. In the zones where the secondary travels through the zone in less than 1319 ticks, the data can start on some tooth preceeding the actual zone boundary as long as the bit patterns continue to propel the secondary completely beyond the last tooth of the zone. To simplify the discussion throughout, it was assumed the data always starts at the first tooth of the zone.

Referring to FIG. 9, when the operator is ready to make a transition from a first, old steady state to a second, new steady state, he first specifies the new steady state and the slope transition time ST. The machine control decides if the transition can be made in a single step or multiple steps. If multiple steps are involved, the machine control generates the transition ticks vs teeth, data tables for the first step, determines the ticks vs bit patterns and loads them into the transition memory, RAM Y (ref FIG. 16). The machine control then determines the ticks vs bit pattern for the first step 37 second" steady state and loads it into the second steady state memory, RAM Z. When the operator starts the transition operation, the machine control generates the next step of transition data tables and bit patterns, which in the case of a two step transition would result in reaching the final "second" steady state after which the calculations would be complete. The machine control would automatically execute the second step of transition.

I claim:
1. A method of providing steady state data for continuously propelling multiple, synchronous, linear motor secondaries from a closely spaced, initial speed condition to a spaced apart, final speed condition along a linear motor primary having teeth electrically divided into zones for control, comprising the steps of:

defining a motion profile for a steady state condition for the secondaries moving along the linear motor primary;

selecting the number of data output intervals desired between secondaries entering the primary and providing a memory address array in a zone controller memory, the number of addresses in the array equal to the desired number of intervals;

generating a table of data describing the motion profile in terms of time versus position instructions defined as the time in the data output intervals for a secondary to reach each tooth along the primary;

performing a modulo operation on the data output intervals when the secondary enters each zone to generate for each zone an entry address in the array of memory addresses to locate the data point where the secondary reaches a first tooth in that zone according to the defined motion profile;

mapping the remaining time versus position instructions onto the memory address array after the start address one for one;

determining for each time interval in the data output intervals, a bit pattern to control the energizing of each zone to accomplish the secondary motion profile;

storing the bit patterns in the address locations in the zone controller memories;

simultaneously addressing all zone controller memories and outputting the stored bit patterns for controlling each of the zones so that each secondary follows the defined motion profile as it moves along the zones of the primary.

2. The method of claim 1, wherein the step of defining a motion profile for a steady state condition further comprises the steps of:
selecting a number of discrete positions along the primary for defining therebetween a plurality of motion profile segments along the primary;
defining a desired speed of the secondary at each of these discrete positions;
storing in a computer a plurality of predefined analog motion relationships that the secondary can follow in the segments between each of the discrete positions;
selecting one of the predefined motion relationships for the secondary to follow for each segment as the secondary continuously moves along the primary;
combining in the computer the selected motion relationships for each segment to define the desired motion profile.

3. A method of providing transition data for continuously propelling multiple, synchronous, linear motor secondaries from a first steady state operation to a second different steady state operation where the secondaries in each steady state are traveling at a closely spaced, initial speed condition to a spaced apart, final speed condition along a linear motor primary having teeth electrically divided into zones for control, comprising the steps of:
defining a first and second steady state motion profiles for the secondaries moving along the linear motor primary;
generating a table of data describing the first and second steady state motion profiles in terms of time versus position defined as the time in data output intervals for a secondary to reach each tooth along the primary;
selecting a common mathematical method for representing the steady state motion profiles and a set of transition motion profiles defining the motion of all secondaries moving along the primary during the transition operation, each transition profile being a function of the steady state profiles and being proportionately distributed between them, the proportion determined by a weighting function;
determining for each time interval in the data output intervals, a bit pattern to control the energizing of each zone to accomplish the secondary motion profiles;
storing the bit patterns in address locations in zone controller memories;
simultaneously addressing all zone controller memories containing the first steady state motion profiles and outputting the stored bit patterns for controlling each of the zones so that each secondary follows the first steady state motion profiles;
terminating the addressing of all zone controller memories containing the first steady state motion profile and simultaneously addressing all zone controller memories containing the transition motion profiles and outputting the stored bit patterns for controlling each of the zones so that each secondary moving along the primary during the transition operation follows the transition motion profiles for that secondary;
terminating the addressing of all zone controller memories containing transition motion profiles and simultaneously addressing all zone controller memories containing the second steady state motion profiles and outputting the stored bit patterns for controlling each of the zones so that each secondary follows the second steady state motion profiles.

4. The method of claim 3, wherein the weighting function is a proportioning according to the fraction of (a) an ordinal number of the secondary after a slope transition begins to (b) the total number of the secondaries to be involved in the transition.

5. The method of claim 3, wherein the mathematical method is an expression of the profile in terms of time versus position of the secondaries along the primary.

6. The method of claim 3, wherein the mathematical method is an expression of the profile in terms of inverse speed versus position of the secondaries along the primary.

7. The method of claim 3, wherein the mathematical method is an expression of the profile in terms of actual speed versus position of the secondaries along the primary.

8. The method of claim 3, wherein the weighting function is a proportioning according to the fraction of (a) the time for a secondary to reach a preceeding tooth after a slope transition begins to (b) the total slope transition time.

9. A method of determining control data for propelling multiple, synchronous linear motor secondaries along a primary having teeth and electrically divided into zones for control, wherein the secondaries are transitioning over a designated time from a first steady state motion profile to a second different steady state motion profile and wherein each secondary affected by the transition operation follows a particular transition profile somewhere between the steady state profiles, comprising the steps of:
defining the first steady state profile for the secondary in terms of values of the time in data output intervals that it takes the secondary to reach each tooth;
defining the second steady state profile for the secondary in terms of values of the time in the data output intervals that it takes the secondary to reach each primary tooth;
defining a particular transition profile for each secondary affected by the transition operation by slipping the data from the first profile to the second profile based on a time weighting function comparing, at each tooth, a time related variable for the particular secondary to the corresponding time related expression for the designated transition time, the time weighting function having a value between zero and one and being continuous and non-decreasing for increasing time over the time for transition.

* * * * *